US011837242B2

(12) United States Patent
Jansson et al.

(10) Patent No.: US 11,837,242 B2
(45) Date of Patent: Dec. 5, 2023

(54) SUPPORT FOR GENERATION OF COMFORT NOISE

(71) Applicant: Telefonaktiebolaget LM Ericsson (publ), Stockholm (SE)

(72) Inventors: Fredrik Jansson, Sundbyberg (SE); Erik Norvell, Upplands Väsby (SE); Tomas Jansson Toftgård, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/844,803

(22) Filed: Jun. 21, 2022

(65) Prior Publication Data

US 2022/0328055 A1 Oct. 13, 2022

Related U.S. Application Data

(63) Continuation of application No. 17/045,103, filed as application No. PCT/EP2019/058650 on Apr. 5, 2019, now Pat. No. 11,404,069.

(Continued)

(51) Int. Cl.
*G10L 19/012* (2013.01)
*G10L 19/008* (2013.01)
(Continued)

(52) U.S. Cl.
CPC .......... *G10L 19/012* (2013.01); *G10L 19/008* (2013.01); *G10L 19/0017* (2013.01);
(Continued)

(58) Field of Classification Search
CPC .................................................... G10L 19/012
See application file for complete search history.

(56) References Cited

U.S. PATENT DOCUMENTS 9,865,274 B1 * 1/2018 Vicinus ................. H04N 7/147
2003/0219130 A1   11/2003 Baumgarte et al.
(Continued)

FOREIGN PATENT DOCUMENTS

CN       1639770 A      7/2005
CN     101809657 A      8/2010
(Continued)

OTHER PUBLICATIONS

Zhu, et al., "Audio Quality Assessment Improvement via Circular and Flexible Overlap," 2011 IEEE International Symposium on Multimedia. (Year: 2011).*

(Continued)

*Primary Examiner* — Feng-Tzer Tzeng
(74) *Attorney, Agent, or Firm* — Withrow & Terranova, PLLC

(57) ABSTRACT

A method and a transmitting node for supporting generation of comfort noise for at least two audio channels at a receiving node. The method is performed by a transmitting node. The method comprises determining spectral characteristics of audio signals on at least two input audio channels and determining a spatial coherence between the audio signals. The spatial coherence is associated with perceptual importance measures. A compressed representation of the spatial coherence is determined per frequency band by weighting the spatial coherence within each frequency band according to the perceptual importance measures. Information about the spectral characteristics and the compressed representation of the spatial coherence per frequency band is signaled to the receiving node for enabling the generation of the comfort noise at the receiving node.

18 Claims, 10 Drawing Sheets

Related U.S. Application Data

(60) Provisional application No. 62/652,949, filed on Apr. 5, 2018, provisional application No. 62/653,078, filed on Apr. 5, 2018, provisional application No. 62/652,941, filed on Apr. 5, 2018.

(51) Int. Cl.
   *G10L 19/032* (2013.01)
   *G10L 19/04* (2013.01)
   *G10L 19/06* (2013.01)
   *G10L 19/00* (2013.01)
   *H04W 76/28* (2018.01)

(52) U.S. Cl.
   CPC ............ *G10L 19/032* (2013.01); *G10L 19/04* (2013.01); *G10L 19/06* (2013.01); *H04W 76/28* (2018.02)

(56) References Cited

U.S. PATENT DOCUMENTS

| | | |
|---|---|---|
| 2004/0002856 A1 | 1/2004 | Bhaskar et al. |
| 2005/0154584 A1 | 7/2005 | Jelinek et al. |
| 2014/0211966 A1 | 7/2014 | Hetherington |
| 2015/0181018 A1 | 6/2015 | Mani et al. |
| 2015/0249892 A1 | 9/2015 | Kuhnel et al. |
| 2017/0047072 A1* | 2/2017 | Eriksson ............... G10L 19/012 |
| 2018/0205830 A1 | 7/2018 | Wells-Rutherford et al. |
| 2018/0240471 A1 | 8/2018 | Markovich Golan et al. |
| 2021/0090582 A1 | 3/2021 | Norvell et al. |
| 2021/0151060 A1 | 5/2021 | Jansson et al. |
| 2021/0158825 A1 | 5/2021 | Norvell et al. |

FOREIGN PATENT DOCUMENTS

| | | |
|---|---|---|
| CN | 104050969 A | 9/2014 |
| EP | 3244404 A1 | 11/2017 |
| JP | 2005509926 A | 4/2005 |
| KR | 20160125481 A | 10/2016 |
| WO | 2015122809 A1 | 8/2015 |

OTHER PUBLICATIONS

Zhu, et al., "Audio Quality Assessment Improvement via Circular and Flexible Overlap," 2011 IEEE International Symposium on Multimedia.—see attached reference in previous Office action. (Year: 2011).*

Author Unknown, "Technical Specification Group Services and System Aspects; Codec for Enhanced Voice Services (EVS); Detailed Algorithmic Description (Release 13)," Technical Specification 26.445, Version 13.4.1, Mar. 2017, 3GPP Organizational Partners, 659 pages.

Author Unknown, "Technical Specification Group Services and System Aspects; Codec for Enhanced Voice Services (EVS); Comfort Noise Generation (CNG) Aspects (Release 12)," Technical Specification 26.449, Version 12.0.0, Sep. 2014, 3GPP Organizational Partners, 8 pages.

Notice of Reasons for Refusal for Japanese Patent Application No. 2022-091269, dated Apr. 11, 2023, 8 pages.

Written Decision on Registration for Korean Patent Application No. 10-2020-7031954, dated Apr. 5, 2023, 8 pages.

Written Decision on Registration for Korean Patent Application No. 10-2020-7031390, dated Feb. 2, 2023, 6 pages.

Zhue, et al., "Audio Quality Assessment Improvement via Circular and Flexible Overlap," International Symposium on Multimedia, 2011, IEEE, pp. 47-52.

Intention to Grant for European Patent Application No. 19717450.1, dated Feb. 23, 2021, 5 pages.

Extended European Search Report for European Patent Application No. 21185347.8, dated Aug. 3, 2021, 6 pages.

Notice of Reasons for Rejection for Japanese Patent Application No. 2020-554191, dated Jan. 11, 2022, 5 pages.

International Search Report and Written Opinion for International Patent Application No. PCT/EP2019/058650, dated Jul. 4, 2019, 11 pages.

Intention to Grant for European Patent Application No. 19716874.3, dated Mar. 16, 2021, 5 pages.

Intention to Grant for European Patent Application No. 19716874.3, dated Aug. 4, 2021, 5 pages.

International Search Report and Written Opinion for International Patent Application No. PCT/EP2019/058629, dated Jul. 8, 2019, 11 pages.

Non-Final Office Action for U.S. Appl. No. 17/045,103, dated Sep. 22, 2021, 9 pages.

Notice of Allowance for U.S. Appl. No. 17/045,103, dated Feb. 18, 2022, 7 pages.

Non-Final Office Action for U.S. Appl. No. 17/044,740, dated Nov. 19, 2021, 11 pages.

Final Office Action for U.S. Appl. No. 171044,740, dated Mar. 7, 2022, 12 pages.

Advisory Action for U.S. Appl. No. 17/044,740, dated May 26, 2022, 3 pages.

Notice of Allowance for U.S. Appl. No. 17/044,740, dated Jun. 29, 2022, 7 pages.

First Office Action for Chinese Patent Application No. 201980034376.5, dated Sep. 13, 2023, 6 pages.

Notice of Reasons for Refusal for Japanese Patent Application No. 2022-091269, dated Sep. 12, 2023, 4 pages.

\* cited by examiner

SUPPORT FOR GENERATION OF COMFORT NOISE

This application is a continuation of U.S. patent application Ser. No. 17/045,103, filed Oct. 2, 2020, now U.S. Pat. No. 11,404,069 B2, which is a 35 U.S.C. § 371 national phase filing of International Application No. PCT/EP2019/058650, filed Apr. 5, 2019, which claims priority to U.S. Provisional Application Nos. 62/652,941, 62/652,949, and 62/653,078, filed Apr. 5, 2018, the disclosures of which are incorporated herein by reference in their entireties.

TECHNICAL FIELD

Embodiments presented herein relate to a method, a transmitting node, a computer program, and a computer program product for supporting generation of comfort noise for at least two audio channels at a receiving node. Embodiments presented herein further relate to a method, a receiving node, a computer program, and a computer program product for generation of the comfort noise at the receiving node.

BACKGROUND

In communications networks, there may be a challenge to obtain good performance and capacity for a given communications protocol, its parameters and the physical environment in which the communications network is deployed.

For example, although the capacity in telecommunication networks is continuously increasing, it is still of interest to limit the required resource usage per user. In mobile telecommunication networks less required resource usage per call means that the mobile telecommunication network can service a larger number of users in parallel. Lowering the resource usage also yields lower power consumption in both devices at the user-side (such as in terminal devices) and devices at the network-side (such as in network nodes). This translates to energy and cost saving for the network operator, whilst enabling prolonged battery life and increased talk-time to be experienced in the terminal devices.

One mechanism for reducing the required resource usage for speech communication applications in mobile telecommunication networks is to exploit natural pauses in the speech. In more detail, in most conversations only one party is active at a time, and thus the speech pauses in one communication direction will typically occupy more than half of the signal. One way to utilize this property in order to decrease the required resource usage is to employ a Discontinuous Transmission (DTX) system, where the active signal encoding is discontinued during speech pauses.

During speech pauses it is common to transmit a very low bit rate encoding of the background noise to allow for a Comfort Noise Generator (CNG) system at the receiving end so as to fill the above-mentioned pauses with a background noise having similar characteristics as the original noise. The CNG makes the sound more natural compared to having silence in the speech pauses since the background noise is maintained and not switched on and off together with the speech. Complete silence in the speech pauses is commonly perceived as annoying and often leads to the misconception that the call has been disconnected.

A DTX system might further rely on a Voice Activity Detector (VAD), which indicates to the transmitting device whether to use active signal encoding or low rate background noise encoding. In this respect the transmitting device might be configured to discriminate between other source types by using a (Generic) Sound Activity Detector (GSAD or SAD), which not only discriminates speech from background noise but also might be configured to detect music or other signal types, which are deemed relevant.

Communication services may be further enhanced by supporting stereo or multichannel audio transmission. In these cases, the DTX/CNG system might also consider the spatial characteristics of the signal in order to provide a pleasant-sounding comfort noise.

A common mechanism to generate comfort noise is to transmit information about the energy and spectral shape of the background noise in the speech pauses. This can be done using significantly less number of bits than the regular coding of speech segments.

At the receiving device side the comfort noise is generated by creating a pseudo random signal and then shaping the spectrum of the signal with a filter based on information received from the transmitting device. The signal generation and spectral shaping can be performed in the time or the frequency domain.

SUMMARY

An object of embodiments herein is to enable efficient generation of comfort noise for two or more channels.

According to a first aspect there is presented a method for supporting generation of comfort noise for at least two audio channels at a receiving node. The method is performed by a transmitting node. The method comprises determining spectral characteristics of audio signals on at least two input audio channels. The method comprises determining a spatial coherence between the audio signals on the respective input audio channels, wherein the spatial coherence is associated with perceptual importance measures. The method comprises dividing the spatial coherence into frequency bands, wherein a compressed representation of the spatial coherence is determined per frequency band by weighting the spatial coherence within each frequency band according to the perceptual importance measures. The method comprises signaling information about the spectral characteristics and information about the compressed representation of the spatial coherence per frequency band to the receiving node, for enabling the generation of the comfort noise for the at least two audio channels at the receiving node.

According to a second aspect there is presented transmitting node for supporting generation of comfort noise for at least two audio channels at a receiving node. The transmitting node comprises processing circuitry. The processing circuitry is configured to cause the transmitting node to determine spectral characteristics of audio signals on at least two input audio channels. The processing circuitry is configured to cause the transmitting node to determine a spatial coherence between the audio signals on the respective input audio channels, wherein the spatial coherence is associated with perceptual importance measures. The processing circuitry is configured to cause the transmitting node to divide the spatial coherence into frequency bands, wherein a compressed representation of the spatial coherence is determined per frequency band by weighting the spatial coherence within each frequency band according to the perceptual importance measures. The processing circuitry is configured to cause the transmitting node to signal information about the spectral characteristics and information about the compressed representation of the spatial coherence per frequency band to the receiving node, for enabling the generation of the comfort noise for the at least two audio channels at the receiving node.

According to a third aspect there is presented a computer program for supporting generation of comfort noise for at least two audio channels at a receiving node, the computer program comprising computer program code which, when run on a transmitting node, causes the transmitting node to perform a method according to at least the first aspect.

According to a fourth aspect there is presented a computer program product comprising a computer program according to the third aspect and a computer readable storage medium on which the computer program is stored. The computer readable storage medium could be a non-transitory computer readable storage medium.

According to a fifth aspect there is presented a radio transceiver device. The radio transceiver device comprises a transmitting node according to the second aspect.

Advantageously these methods, these transmitting nodes, this computer program, this computer program product and this radio transceiver device enable efficient generation of comfort noise for two or more channels.

Advantageously these methods, these transmitting nodes, this computer program, this computer program product and this radio transceiver device enable comfort noise to be generated for two or more channels without suffering from the issues noted above.

Advantageously these methods, these transmitting nodes, this computer program, this computer program product and this radio transceiver device enable the amount of information that needs to be encoded in a stereo or multi-channel DTX system to be reduced, whilst keeping the ability to recreate a realistic stereo image at the receiving node.

Other objectives, features and advantages of the enclosed embodiments will be apparent from the following detailed disclosure, from the claims as well as from the drawings.

BRIEF DESCRIPTION OF THE DRAWINGS

The inventive concept is now described, by way of example, with reference to the accompanying drawings, in which.

DETAILED DESCRIPTION

Figure 1:
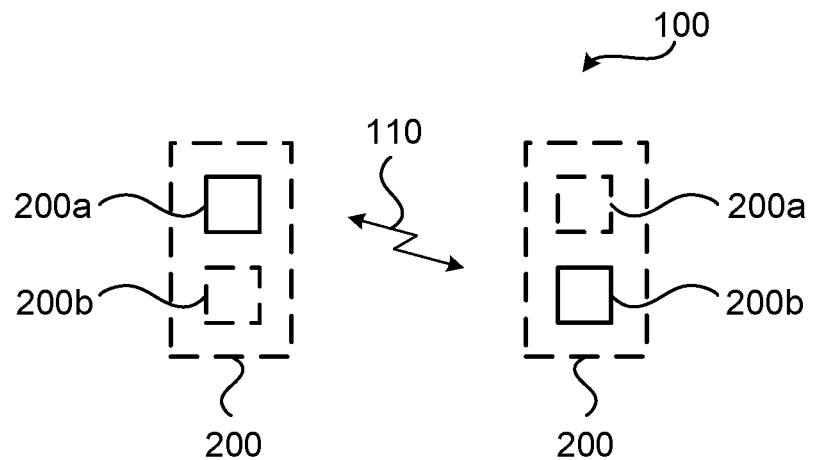
FIG. 1 is a schematic diagram illustrating a communication network according to embodiments.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The spatial coherence constitutes spatial properties of the multi-channel audio representation and may also be called channel coherence as it is representing the coherence between the audio channels. In the following description, terms channel coherence and spatial coherence are interchangeably used.

When two mono encoders each having its own DTX system working separately on the signals in each of the two stereo channels are used, different energies and spectral shapes in the two different signals will be transmitted.

In most realistic cases the difference in energy and spectral shape between the signal in the left channel and the signal in the right channel will not be large but there could still be a big difference in how wide the stereo image of the signal is perceived.

If the random sequences used to generate the comfort noise is synchronized between the signal in the left channel and the signal in the right channel the result will be a stereo signal sounds with a very narrow stereo image and which gives the sensation of the sound originating from the center of the head of the listener. If instead the signal in the left channel and the signal in the right channel would not be synchronized it would give the opposite effect, i.e. a signal with a very wide stereo image.

In most cases the original background noise will have a stereo image that is somewhere in-between these two extremes which mean that, either with synchronized or not synchronized random sequences, there would be an annoying difference in the stereo image when the transmitting device switches between active speech encoding, with a good representation of the stereo width, and non-active noise encoding.

The perceived stereo image width of the original background noise might also change during a call, e.g. because the user of the transmitting device is moving around and/or because of things occurring in the background. A system with two mono encoders each having its own DTX system has no mechanism to follow these changes.

One additional issue with using a dual mono DTX system is that the VAD decision will not be synchronized between the two channels, which might lead to audible artifacts when e.g. the signal in the left channel is encoded with active encoding and the signal in the right channel is encoded with the low bit rate comfort noise encoding. It might also lead to that the random sequence will be synchronized in some time instances and unsynchronized in others, resulting in a stereo image that toggles between being extremely wide and extremely narrow over time.

Hence, there is still a need for an improved generation of comfort noise for two or more channels.

The following embodiments describe a DTX system for two channels (stereo audio), but the methods may in general be applied for DTX and CNG for multi-channel audio.

FIG. 1 is a schematic diagram illustrating a communication network 100 where embodiments presented herein can be applied. The communications network 100 comprises a transmitting node 200a communicating with a receiving node 200b over a communications link 110.

The transmitting node 200a might communicate with the receiving node 200b over a direct communication link 110 or over an indirect communication link 110 via one or more other devices, nodes, or entities, such as network nodes, etc. in the communication network 100.

In some aspects the transmitting node 200a is part of a radio transceiver device 200 and the receiving node 200b is part of another radio transceiver device 200. Additionally, in some aspects the radio transceiver device 200 comprises both the transmitting node 200a and the receiving node 200b. There could be different examples of radio transceiver devices. Examples include, but are not limited to, portable wireless devices, mobile stations, mobile phones, handsets, wireless local loop phones, user equipment (UE), smartphones, laptop computers, and tablet computers.

Figure 2:
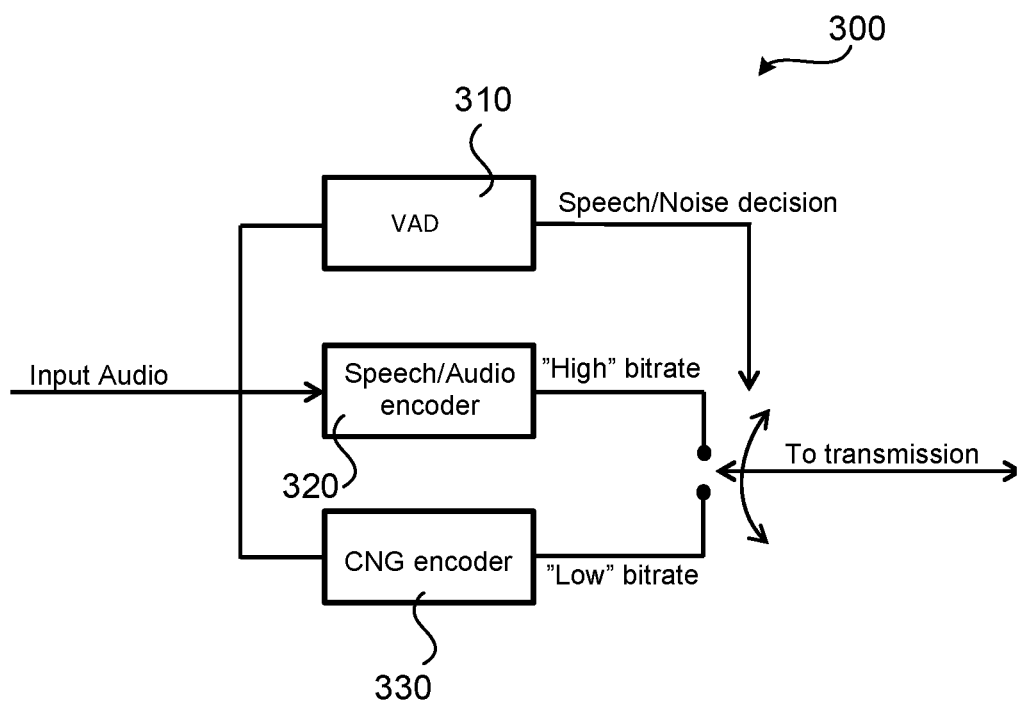
FIG. 2 schematically illustrates a DTX system according to an embodiment.

As disclosed above, a DTX system can be used in order to transmit encoded speech/audio only when needed. FIG. 2 is a schematic block diagram of a DTX system 300 for one or more audio channels. The DTX system 300 could be part of, collocated with, or implemented in, the transmitting node 200a. Input audio is provided to a VAD 310, a speech/audio encoder 320 and a CNG encoder 330. The speech/audio encoder is activated when the VAD indicates that the signal contains speech or audio and the CNG encoder is activated when the VAD indicates that the signal contains background noise. The VAD correspondingly selectively controls whether to transmit the output from the speech/audio encoder or the CNG encoder. Issues with existing mechanisms for generation of comfort noise for two or more channels have been disclosed above.

The embodiments disclosed herein therefore relate to mechanisms for supporting generation of comfort noise for at least two audio channels at a receiving node 200b and for generation of comfort noise for at least two audio channels at a receiving node 200b. In order to obtain such mechanisms there is provided a transmitting node 200a, a method performed by the transmitting node 200a, a computer program product comprising code, for example in the form of a computer program, that when run on a transmitting node 200a, causes the transmitting node 200a to perform the method. In order to obtain such mechanisms there is further provided a receiving node 200b, a method performed by the receiving node 200b, and a computer program product comprising code, for example in the form of a computer program, that when run on processing circuitry of the receiving node 200b, causes the receiving node 200b to perform the method.

Figure 3:
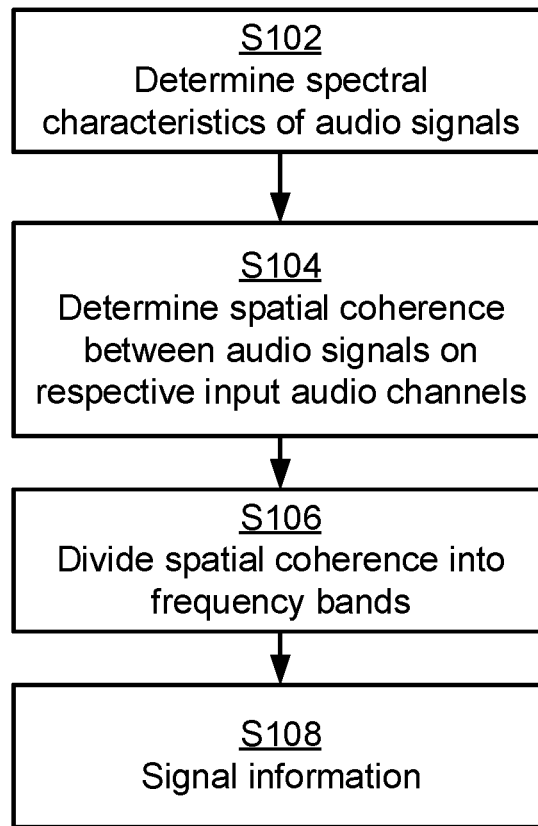
FIGS. 3 and 4 are flowcharts of methods according to embodiments.

FIG. 3 is a flowchart illustrating embodiments of methods for supporting generation of comfort noise for at least two audio channels at a receiving node 200b. The methods are performed by the transmitting node 200a. The methods are advantageously provided as computer programs 1420.

S102: The transmitting node 200a determines spectral characteristics of audio signals on at least two input audio channels.

S104: The transmitting node 200a determines a spatial coherence between the audio signals on the respective input audio channels. The spatial coherence is associated with perceptual importance measures.

The spatial coherence is encoded in a very efficient way before transmission since the whole rationale behind using the DTX system 300 is to transmit as little information as needed in the pauses between the speech/audio.

S106: The transmitting node 200a divides the spatial coherence into frequency bands. A compressed representation of the spatial coherence is determined per frequency band by weighting the spatial coherence values within each frequency band according to the perceptual importance measures.

S108: The transmitting node 200a signals information about the spectral characteristics and information about the compressed representation of the spatial coherence per frequency band to the receiving node, for enabling the generation of the comfort noise for the at least two audio channels at the receiving node 200b.

According to an embodiment the perceptual importance measure is based on the spectral characteristics of the at least two input audio channels.

According to an embodiment the perceptual importance measure is determined based on the power spectra of the at least two input audio channels.

According to an embodiment the perceptual importance measure is determined based on the power spectrum of a weighed sum of the at least two input audio channels.

According to an embodiment the compressed representation of the spatial coherence is being one single value per frequency band.

Figure 4:
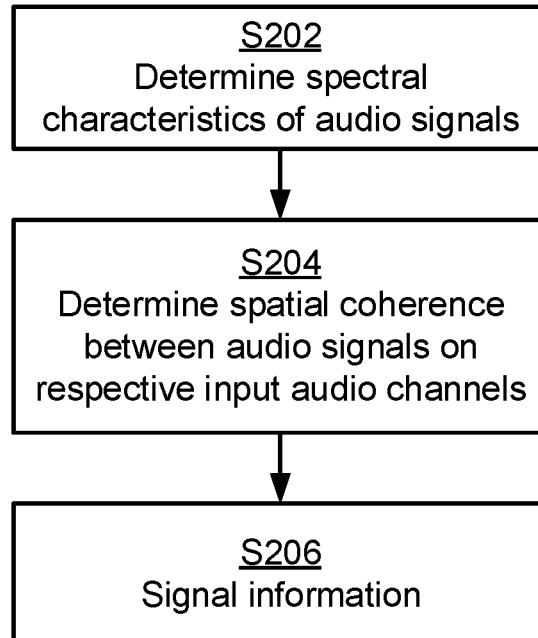

FIG. 4 is a flowchart illustrating embodiments of methods for supporting generation of comfort noise for at least two audio channels at a receiving node 200b. The methods are performed by the transmitting node 200a. The methods are advantageously provided as computer programs 1420.

S202: The transmitting node 200a determines spectral characteristics of audio signals on at least two input audio channels. The spectral characteristics are associated with perceptual importance measures.

S204: The transmitting node 200a determines a spatial coherence between the audio signals on the respective input audio channels. The spatial coherence is divided into frequency bands.

The spatial coherence is encoded in a very efficient way before transmission since the whole rationale behind using the DTX system 300 is to transmit as little information as needed in the pauses between the speech/audio. One single value of the spatial coherence is therefore determined per frequency band.

The single value of the spatial coherence is determined by weighting the spatial coherence values within each frequency band. One purpose of the weighting function used for the weighting is to put a higher weight on spatial coherences that occur at frequencies being perceptually more important than others. Hence, the spatial coherence values within each frequency band are weighted according to the perceptual importance measures of the corresponding values of the spectral characteristics.

S206: The transmitting node 200a signals information about the spectral characteristics and information about the single values of the spatial coherence per frequency band to the receiving node 200b, for enabling the generation of the comfort noise for the at least two audio channels at the receiving node 200b.

At the decoder at the receiving node 200b the coherence is reconstructed and a comfort noise signal with a stereo image similar to the original sound is created.

Embodiments relating to further details of supporting generation of comfort noise for at least two audio channels at a receiving node 200b as performed by the transmitting node 200a will now be disclosed.

The herein disclosed embodiments are applicable to a stereo encoder and decoder architecture as well as for a multi-channel encoder and decoder where the channel coherence is considered in channel pairs.

In some aspects the stereo encoder receives a channel pair [l(m, n) r(m, n)] as input, where l(m, n) and r(m, n) denote the input signals for the left and right channel, respectively, for sample index n of frame m. The signal is processed in frames of length N samples at a sampling frequency $f_s$, where the length of the frame might include an overlap (such as a look-ahead and/or memory of past samples).

As in FIG. 2 a stereo CNG encoder is activated when the stereo encoder VAD indicates that the signal contains background noise. The signal is transformed to frequency domain by means of e.g. a discrete Fourier transform (DFT) or any other suitable filter-bank or transform such as quadrature mirror filter (QMF), Hybrid QMF or modified discrete cosine transform (MDCT). In case a DFT or MDCT transform is used, the input signal is typically windowed before the transform, resulting in the channel pair [$l_{win}$(m, n) $r_{win}$(m, n)] determined according to:

$$[l_{win}(m,n) r_{win}(m,n)] = [l(m,n)\text{win}(n) r(m,n)\text{win}(n)], n=0,1,2,\ldots,N-1.$$

Hence, according to an embodiment the audio signals l(m, n), r(m, n), for frame index m and sample index n, of the at least two audio channels are windowed to form respective windowed signals $l_{win}$(m, n), $r_{win}$(m, n) before the spectral characteristics are determined. The choice of window might generally depend on various parameters, such as time and frequency resolution characteristics, algorithmic delay (overlap length), reconstruction properties, etc. The thus windowed channel pair [$l_{win}$(m, n) $r_{win}$(m, n)] is then transformed according to:

$$[L(m, k) R(m, k)] = [DFT(l_{win}(m, n)) DFT(r_{win}(m, n))], \begin{cases} n = 0, 1, 2, \ldots, N-1 \\ k = 0, 1, 2, \ldots, N-1 \\ m = 0, 1, 2, \ldots \end{cases}$$

A general definition of the channel coherence $C_{gen}$(f) for frequency f is given by:

$$C_{gen}(f) = \frac{|S_{xy}(f)|^2}{S_{xx}(f) S_{yy}(f)}$$

where $S_{xx}$(f) and $S_{yy}$(f) represent the respective power spectrum of the two channels x and y, and $S_{xy}$(f) is the cross power spectrum of the two channels x and y. In a DFT based solution, the spectra may be represented by the DFT spectra. Particularly, according to an embodiment the spatial coherence C(m, k) for frame index m and frequency bin index k is determined as:

$$C(m, k) = \frac{|L(m, k)^* \cdot R(m, k)|^2}{|L(m, k)|^2 \cdot |R(m, k)|^2}$$

where L(m, k) is the spectrum of the windowed audio signal $l_{win}$(m, n), where R(m, k) is the spectrum of the windowed audio signal $r_{win}$(m, n), and where * denotes the complex conjugate.

The above expression for the coherence is commonly computed with a high frequency resolution. One reason for this is that the frequency resolution depends on the signal frame size, which typically would be the same for CNG encoding as for active speech/audio encoding where a high resolution is desired. Another reason is that a high frequency resolution allows for a perceptually motivated frequency band division. Yet another reason could be that elements of the coherence calculation, i.e. L(m, k), R(m, k), $S_{xx}$, $S_{xy}$, $S_{yy}$ may, in a typical audio encoder, be used for other purposes where a higher frequency resolution is desired. A typical value with a sampling frequency $f_s$=48 kHz and frame length of 20 ms would be 960 frequency bins for the channel coherence.

Figure 5:
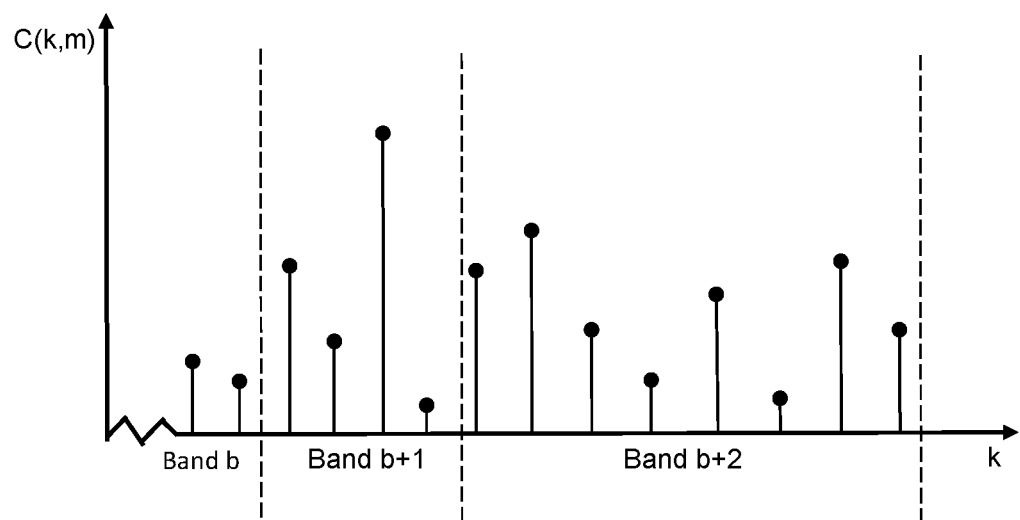
FIGS. 5 and 6 schematically illustrate spectra of channel coherence values according to embodiments.

For an application of DTX where it is crucial to keep the bit rate for encoding inactive (i.e. non-speech) segments low it is not feasible to transmit the channel coherence with high frequency resolution. To reduce the number of bits needed to represent the channel coherence, the spectrum can be divided into frequency bands, as shown in FIG. 5, where the channel coherence within each frequency band would be represented by a single value or some other compressed representation. The number of frequency bands is typically in the order of 2-50 for the full audible bandwidth of 20-20000 Hz.

All frequency bands might have equal frequency-wise width, but more common in audio coding applications is to match the width of each frequency band to the human perception of audio, thus resulting in comparatively narrow frequency bands for the low frequencies and increasing widths of the frequency bands for higher frequencies. Particularly, according to an embodiment the spatial coherence is divided into frequency bands of non-equal lengths. For example, the frequency bands can be created using the ERB-rate scale, where ERB is short for equivalent rectangular frequency bandwidth.

In one embodiment the compressed representation of the coherence is defined by the mean value of the coherence within each frequency band and this single value per frequency band is transmitted to the decoder at the receiving node 200b such that the decoder then can use this single value for all frequencies within the frequency band when generating the comfort noise, or possibly with some smoothing over signal frames and/or frequency bands in order to avoid abrupt changes in time and/or frequency.

However, as disclosed above in step S204, in another embodiment the different frequencies within a frequency band are in the determination of a single coherence value per frequency band given different weights depending on the perceptual importance measures.

There could be different examples of perceptual importance measures.

In some aspects the perceptual importance measure relates to the spectral characteristics.

Particularly, in one embodiment the perceptual importance measure relates to the magnitude or power spectra of the at least two input audio signals.

In another embodiment the perceptual importance measure relates to the magnitude or power spectrum of a weighted sum on the at least two input audio channels.

In some aspects high energy corresponds to high perceptual importance, and vice versa. Particularly, according to an embodiment the spatial coherence values within each frequency band are weighted such that the spatial coherence values corresponding to frequency coefficients with a higher power has more impact on this one single value of the spatial coherence compared to the spatial coherence values corresponding to frequency coefficients with lower energy.

According to an embodiment the different frequencies within a frequency band are given different weights depending on the power at each frequency. One rationale behind this embodiment is that a frequency with a higher energy should have more impact on the combined coherence value compared to another frequency with lower energy.

In some other aspects the perceptual importance measure relates to encoded spectral characteristics. The encoded spectral characteristics might closer (i.e. closer than spectral characteristics that are not encoded) reflect the signal as reconstructed at the receiving node 200b.

In some other aspects the perceptual importance measure relates to the spatial coherence. It may for example be more perceptually important to represent signal components with a higher spatial coherence more accurately than signal components with a lower spatial coherence. In another aspect the perceptual importance measure may be related to the spatial coherence over time, including actively encoded speech/audio segments. One reason for this is that it may be perceptually important to generate spatial coherence of similar characteristics as in actively encoded speech/audio segments.

Other perceptual importance measures are also envisioned.

According to an embodiment a weighted mean is used to represent the coherence in each frequency band where the transformed energy spectrum $|LR(m, k)|^2$ for the mono signal $lr(m, n) = w_1 l(m, n) + w_2 r(m, n)$ defines the perceptual importance measures within frame m and is used as the weighting function. That is, in some aspects the energy spectrum $|LR(m, k)|^2$ of $lr(m, n) = w_1 l(m, n) + w_2 r(m, n)$ is used for weighting the spatial coherence values. The downmix weights $w_1$ and $w_2$ may be constant or variable over time or, if similar operation is performed in the frequency domain, constant or variable over frequency. In one embodiment, the weights on the channels are equal, e.g. $w_1 = w_2 = 0.5$. Then, according to an embodiment each frequency band extends between a lower frequency bin and an upper frequency bin and the one single value of the spatial coherence $C_w(m, b)$ for frame index m and frequency band b is determined as:

$$C_w(m, b) = \frac{\sum_{k=limit(b)}^{limit(b+1)-1} C(m, i) \cdot |LR(m, i)|^2}{\sum_{j=limit(b)}^{limit(b+1)-1} |LR(m, j)|^2}$$

$$b = 0, 1, \ldots, N_{band} - 1,$$

where m is the frame index, b is the index of the frequency band, $N_{band}$ is the total number of frequency bands and where limit(b) denotes the lowest frequency bin of frequency band b. The parameter limit(b) thus describes the first coefficient in each frequency band and defines the borders between the frequency bands. In this embodiment limit(b) would also be defined for frequency band $N_{band}$ to define the upper limit of frequency band $N_{band}-1$. There could be different ways to obtain limit(b). According to an embodiment limit(b) is provided as a function or lookup table.

Figure 6:
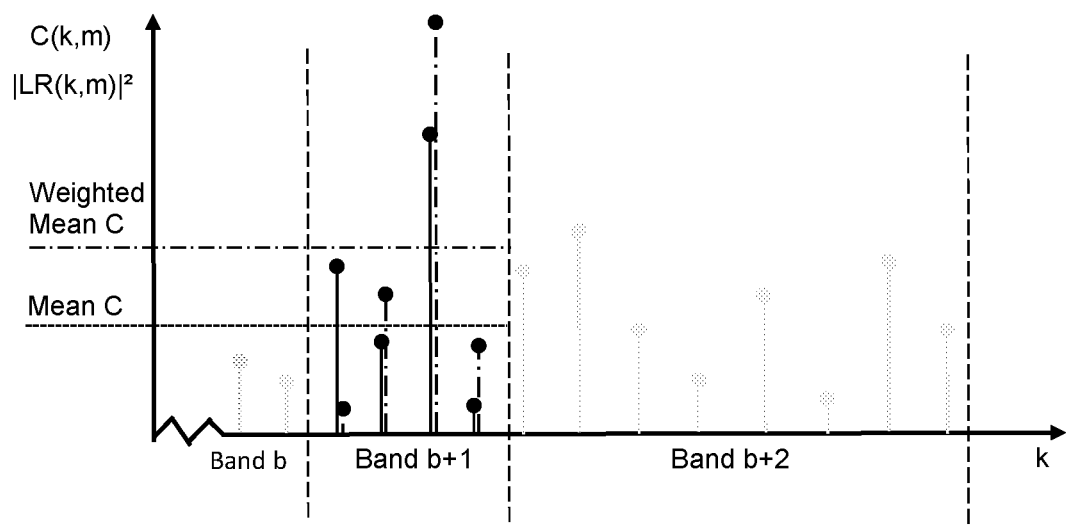

FIG. 6 illustrates the weighting in frequency band b+1. For each frequency bin the points with solid vertical lines show the coherence values and the points with dash-dotted vertical lines show the energy of the corresponding values of the spectral characteristics. The horizontal dotted line shows the mean of the four coherence values in frequency band b+1 and the dash-dotted line shows the weighted mean. In this example the third bin in frequency band b+1 has both a high coherence value and a high energy which leads to that the weighted mean is higher that the non-weighted mean.

Assuming that the energies are the same for all bins in a frequency band, then the weighted mean and the non-weighted mean will be equal. Further, assuming that the energy is zero for all bins in a frequency band except one bin, then the weighted mean will be equal to the coherence value of that one bin.

The spatial coherence values $C_w(m, b)$ are then encoded to be stored or transmitted to a decoder at the receiving node 200b where comfort noise is generated using the decoded coherence in order to create a realistic stereo image.

Encoding of Spatial Coherence According to an Embodiment

The coherence representative values given per frequency band form a spatial coherence vector $C_m = [C_{1,m} \ C_{2,m} \ \cdots \ C_{b,m} \ \cdots \ C_{N_{bnd},m}]$, where $N_{bnd}$ is the number of frequency bands, b is the frequency band index and m is the frame index. In an embodiment, the values $C_{b,m}$ of the spatial coherence vector $C_m$ correspond to the weighted spatial coherence values $C_w(m, b)$ for frame m and band b.

In an embodiment, the coherence vector is encoded using a predictive scheme followed by a variable bit rate entropy coding. The coding scheme further improves the performance through an adaptive inter-frame prediction. The encoding of the coherence vector considers the following properties: (1) adaptable encoding to a varying per-frame bit budget $B_m$, (2) the coherence vector shows strong frame-to-frame similarity, and (3) error propagation should be kept low for lost frames.

To address the varying per-frame bit budget, a coarse-fine encoding strategy is implemented. More specifically, the coarse encoding is first achieved at a low bit rate and the subsequent fine encoding may be truncated when the bit limit is reached.

In some embodiments, the coarse encoding is performed utilizing a predictive scheme. In such embodiments, a predictor works along the coherence vector for increasing bands b and estimates each coefficient based on the previous values of the vector. That is, an intra-frame prediction of the coherence vector is performed and is given by:

$$C_{intra,b,m}^{(q)} = \begin{cases} 0, & b = 1 \\ \sum_{i=1}^{b-1} p_{b,i}^{(q)} C_{i,m}, & 2 \leq b \leq N_{bnd} \end{cases}$$

Each predictor set $p^{(q)}$ consists of $(N_{bnd}-1)$ predictors, each predictor comprising (b−1) predictor coefficients for each band b where q=1, 2, . . . $N_q$ and $N_q$ indicates a total number of predictor sets. As shown above, there are no previous values when b=1 and the intra-frame prediction of the coherence vector is zero. As an example, a predictor set number q when there are six coherence bands, $N_{bnd}=6$, is given by $$P^{(q)} = \{[p_{2,1}^{(q)}], [p_{3,1}^{(q)} p_{3,2}^{(q)}], [p_{4,1}^{(q)} p_{4,2}^{(q)} p_{4,3}^{(q)}], [p_{5,1}^{(q)} p_{5,2}^{(q)} p_{5,3}^{(q)} p_{5,4}^{(q)}], [p_{6,1}^{(q)} p_{6,2}^{(q)} p_{6,3}^{(q)} p_{6,4}^{(q)} p_{6,5}^{(q)}]\}.$$

As another example, the total number of predictor sets may be four, i.e. $N_q=4$, which indicates that the selected predictor set may be signaled using 2 bits. In some embodiments, predictor coefficients for a predictor set q may be addressed sequentially and stored in a single vector of length $\sum_i^{N_{bnd}-1} i = N_{bnd}(N_{bnd}-1)/2$.

Figure 7:
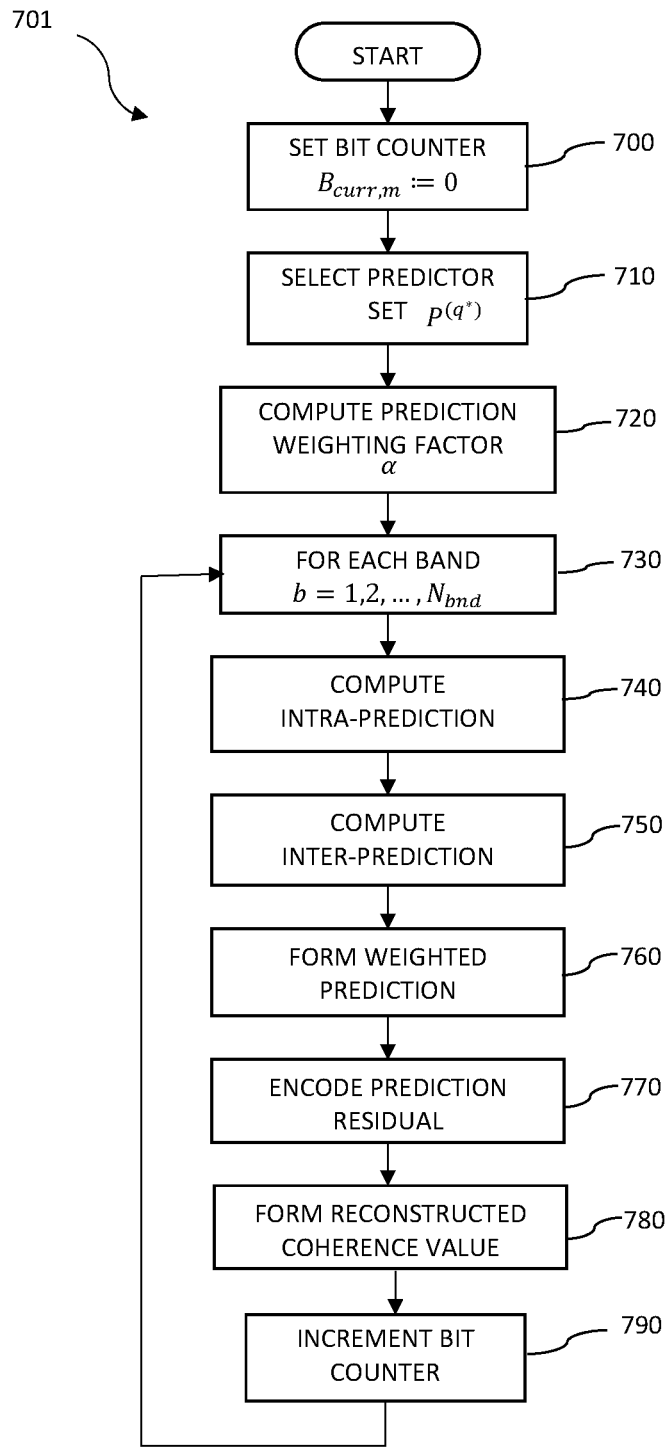
FIG. 7 is a flow chart illustrating an encoding process according to some embodiments.

FIG. 7 is a flow chart illustrating an encoding process 701 according to some embodiments. The encoding process 701 may be performed by the encoder according to the following steps:

In step 700, for each frame m, a bit variable (also referred to as a bit counter) to keep track of the bits spent for the encoding is initialized to zero ($B_{curr,m}=0$). The encoding algorithm receives a coherence vector ($C_{b,m}$) to encode, a copy of the previous reconstructed coherence vector ($\hat{C}_{b,m-1}$), and a bit budget $B_m$. In some embodiments, the bits spent in preceding encoding steps may be included in $B_m$ and $B_{curr,m}$. In such embodiments, the bit budget in the algorithm below can be given by $B_m - B_{curr,m}$.

In step 710, a predictor set $P^{(q*)}$ which gives the smallest prediction error out of the available predictors $P^{(q)}$, $q=1, 2, \ldots, N_q$ is selected. The selected predictor set is given by $$q^* = \operatorname*{argmin}_{q'} \sum_{b=2}^{N_{bnd}} \left| C_{intra,b,m}^{(q')} - C_{b,m} \right|^2, \quad q' = 1, 2, \ldots, N_q.$$

In some embodiments, b=1 is omitted from the predictor set because the prediction is zero and contribution to the error will be the same for all predictor sets. The selected predictor set index is stored and the bit counter ($B_{curr,m}$) is increased with the required number of bits, e.g. $B_{curr,m} = B_{curr,m}+2$ if two bits are required to encode the predictor set.

In step 720, a prediction weighting factor $\alpha$ is computed. The prediction weighting factor is used to create a weighted prediction as described in step 760 below. The weight factor $\alpha$ is determined based on a bit-budget $B_m$ available for encoding the vector of spatial coherence values in each frame m.

In general terms, the weight factor $\alpha$ can take a value in the range from 0 to 1, i.e. from only using information from the current frame ($\alpha=1$) to only using information from the previous frame ($\alpha=0$) and anything in-between ($0<\alpha<1$). It is in some aspects desirable to use an as high weight factor $\alpha$ as possible since a lower weight factor $\alpha$ might make the encoding more sensitive to lost frames. But selection of the weight factor $\alpha$ has to be balanced with the bit budget $B_m$ per frame m since a lower value of the weight factor $\alpha$ commonly yields less encoded bits.

The value of the weight factor $\alpha$ used in the encoding has to, at least implicitly, be known in the decoder at the receiving node 200b. That is, in an embodiment, information about the weight factor $\alpha$ has to be encoded and transmitted (as in step S1016) to the decoder. In other embodiments, the decoder may derive the prediction weight factor based on other parameters already available in the decoder. Further aspects of how to provide the information about the weight factor $\alpha$ will be disclosed below.

It is further assumed that the bit budget $B_m$ for frame m for encoding the spatial coherence is known in the decoder at the receiving node 200b without explicit signaling from the transmitting node 200a. In this respect the value of the bit budget $B_m$ does not need to be explicitly signalled to the receiving node 200b. It comes as a side effect, since the decoder at the receiving node 200b knows how to interpret the bitstream it also knows how many bits have been decoded. The remaining bits are simply found at the decoder at the receiving node 200b by subtracting the decoded number of bits from the total bit budget (which is also known).

In some aspects, based on the bit-budget $B_m$ a set of candidate weight factors is selected and a trial encoding (without performing the rate-truncation strategy as disclosed below) with the combined prediction and residual encoding scheme is performed for all these candidate weight factors in order to find the total number of encoded bits, given the candidate weight factor used. Particularly, according to an embodiment the weight factor $\alpha$ is determined by selecting a set of at least two candidate weight factors and performing trial encoding of the vector of spatial coherence values for each candidate weight factor.

In some aspects, which candidate weight factors to use during the trial encoding is based on the bit-budget $B_m$. In this respect, the candidate weight factors might be determined by means of performing a table lookup with the bit-budget $B_m$ as input or by inputting the bit-budget $B_m$ to a function. The table lookup might be performed on table values obtained through training on a set of background noise.

The trial encoding for each candidate weight factor yields a respective total number of encoded bits for the vector of spatial coherence values. The weight factor $\alpha$ might then be selected depending on whether the total number of encoded bits for the candidate weight factors fits within the bit-budget $B_m$ or not. Particularly, according to an embodiment the weight factor $\alpha$ is selected as the largest candidate weight factor for which the total number of encoded bits fits within the bit-budget $B_m$. According to an embodiment the weight factor $\alpha$ is selected as the candidate weight factor yielding fewest total number of encoded bits when the total number of encoded bits does not fit within the bit-budget $B_m$ for any of the candidate weight factors.

That is, if all candidate weight factors lead to a total number of encoded bits being within the bit-budget $B_m$, the highest candidate weight factor is selected as the weight factor $\alpha$. Likewise, if only the lowest or none of the candidate weight factors lead to a total number of bits within the bit-budget $B_m$, the candidate weight factor that leads to the lowest number of bits is selected as the weight factor $\alpha$. Which of the candidate weight factor is selected is then signaled to the decoder.

An illustrative example where the trial encoding is performed for two candidate weight factors $\alpha_{low}$ and $\alpha_{high}$, resulting in the number of bits $B_{currlow,m}$ and $B_{currhigh,m}$, respectively, needed for the encoding of the vector of spatial coherence values will now be disclosed.

Using $B_{curr,m}$ as the input, two candidate weight factors $\alpha_{low}$ and $\alpha_{high}$ are obtained, either by means of performing a table lookup with the bit-budget $B_m$ as input or by inputting the bit-budget $B_m$ to a function. Trial encoding is performed without the rate-truncation strategy described below for each candidate weight factor $\alpha_{low}$ and $\alpha_{high}$, yielding two values $B_{currlow,m}$ and $B_{currhigh,m}$ of the number of bits needed for the encoding. Based on this, one of the two candidate weight factors $\alpha_{low}$ and $\alpha_{high}$ is selected according for the encoding as follows:

$$\alpha = \begin{cases} \alpha_{high}, & B_{currhigh,m} \leq B_m \\ \alpha_{low}, & B_{currlow,m} \leq B_m < B_{currhigh,m} \\ \operatorname{argmin}(B_{curr,m}), & \min(B_{currlow,m}, B_{currhigh,m}) > B_m \end{cases}.$$

The selected weight factor α is encoded using one bit, e.g. "0" for $α_{low}$ and "1" for $α_{high}$. The third alternative in the expression above for the weight factor α should be interpreted as follows: If both candidate weight factors $α_{low}$ and $α_{high}$ yield a resulting number of encoded bits that exceeds the bit budget $B_m$, then the candidate weight factor yielding the lowest number of encoded bits is selected.

For each of the bands b=1, 2, . . . $N_{bnd}$ in step 730, the following steps are performed:

In step 740, an intra-frame prediction value, $\hat{C}_{intra,b,m}^{(q)}$, is obtained. There are no preceding encoded coherence values for the first band (b=1). In some embodiments, the intra-frame prediction for the first band may be set to zero, $\hat{C}_{intra,1,m}^{(q)}=0$. In some embodiments, the intra-frame prediction for the first band may be set to an average value $\overline{C}$, $\hat{C}_{intra,1,m}^{(q)}=\overline{C}$.

In some alternative embodiments, the coherence value of the first band may be encoded separately. In such embodiments, the first value is encoded using a scalar quantizer to produce reconstructed value $\hat{C}_{SQ,1,m}^{(q)}$. Accordingly, the intra-frame prediction for the first band may be set to the reconstructed value, $\hat{C}_{intra,1,m}^{(q)}=\hat{C}_{SQ,1,m}^{(q)}$. The bit counter, $B_{curr,m}$, is increased by the amount of bits required to encode the coefficient. For example, if 3 bits are used to encode the coefficient, 3 bits are added to the current amount of bits spent for the encoding, for example, $B_{curr,m}:=B_{curr,m}+3$.

For the remaining bands b=2, 3, . . . , $N_{bnd}$, the intra-frame prediction $\hat{C}_{b,m}^{(q)}$ is based on previously encoded coherence values, i.e $\hat{C}_{intra,b,m}^{(q)}=\Sigma_{i=1}^{b-1}p_{b,i}^{(q)}\hat{C}_{i,m}$.

In step 750, an inter-frame prediction value, $\hat{C}_{inter,b,m}$, is obtained based on previously reconstructed coherence vector elements from one or more preceding frames. In cases where the background noise is stable or changing slowly, the frame-to-frame variation in the coherence band values $C_{b,m}$ will be small. Hence, an inter-frame prediction using the values from previous frame will often be a good approximation which yields a small prediction residual and a small residual coding bit rate. As an example, a last reconstructed value for band b may be used for an inter-frame prediction value, i.e. $\hat{C}_{inter,b,m}=\hat{C}_{b,m-1}$. An inter-frame linear predictor considering two or more preceding frames can be formulated as $\hat{C}_{inter,m}=\Sigma_{n=1}^{N_{inter}}g_n\hat{C}_{m-n}$, where $\hat{C}_{inter,m}$ denotes the column vector of inter-frame predicted coherence values for all bands b of frame m, $\hat{C}_{m-n}$ represents the reconstructed coherence values for all bands b of frame m-n and $g_n$ is the linear predictor coefficients which span $N_{inter}$ preceding frames. $g_n$ may be selected out of a pre-defined set of predictors, in which case the used predictor needs to be represented with an index that may be communicated to a decoder.

In step 760, a weighted prediction, $\hat{C}_{pred,b,m}^{(q)}$, is formed based on the intra-frame prediction, $\hat{C}_{intra,b,m}^{(q)}$, the inter-frame prediction, $\hat{C}_{inter,b,m}$, and the prediction weighting factor α. In some embodiments, the weighted prediction is given by $\hat{C}_{pred,b,m}^{(q)}=α\hat{C}_{intra,b,m}^{(q)}+(1-α)\hat{C}_{inter,b,m}$.

In step 770, a prediction residual is computed and encoded. In some embodiments, the prediction residual is computed based on the coherence vector and the weighted prediction, i.e. $r_{b,m}=C_{b,m}-\hat{C}_{pred,b,m}^{(q)}$. In some embodiments, a scalar quantizer is used to quantize the prediction residual to an index $I_{b,m}$. In such embodiments, the index is given by $I_{b,m}=SQ(r_{b,m})$ where $SQ(x)$ is a scalar quantizer function with a suitable range. An example of a scalar quantizer is shown in Table 1 below. Table 1 shows an example of reconstruction levels and quantizer indices for a prediction residual.

TABLE 1

| | I = SQ(x) | | | | | | | | |
|---|---|---|---|---|---|---|---|---|---|
| | 0 | 1 | 2 | 3 | 4 | 5 | 6 | 7 | 8 |
| Reconstruction levels | −0.4 | −0.3 | −0.2 | −0.1 | 0 | 0.1 | 0.2 | 0.3 | 0.4 |

Figures 8, 14:
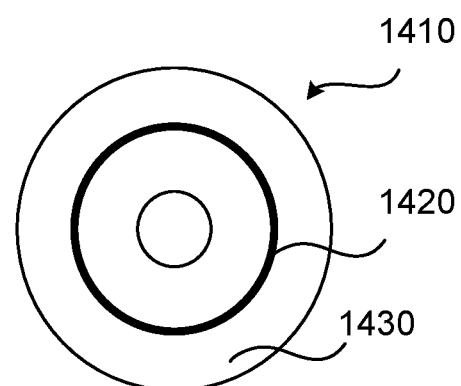
FIG. 8 illustrates a truncation scheme according to some embodiments.
FIG. 14 shows one example of a computer program product comprising computer readable storage medium according to an embodiment.

In some embodiments, the index $I_{b,m}$ is encoded with a variable length codeword scheme that consumes fewer bits for smaller values. Some examples for encoding the prediction residual are Huffman coding, Golomb-Rice coding, and unary coding (the unary coding is the same as the Golomb-Rice coding with divisor 1). In the step of encoding the prediction residual, the remaining bit budget $(B_m-B_{curr,m})$ needs to be considered. If the length of the codeword $L_{code}(I_{b,m})$ corresponding to index $I_{b,m}$ fits within the remaining bit budget, i.e. $L_{code}(I_{b,m}) \leq B_m-B_{curr,m}$, the index $I_{b,m}$ is selected as the final index $I_{b,m}^*$. If the remaining bits are not sufficient to encode the index $I_{b,m}$, a bit rate truncation strategy is applied. In some embodiments, the bit rate truncation strategy includes encoding the largest possible residual value, assuming that smaller residual values cost fewer bits. Such a rate truncation strategy can be achieved by reordering a codebook as illustrated by table 800 in FIG. 8. FIG. 8 shows an exemplary quantizer table 800 with unary codeword mapping for the scalar quantizer example shown in Table 1. In some embodiments, a bit rate truncation may be achieved by advancing upwards in the table 800 in steps of two until codeword 0 is reached. That is, FIG. 8 illustrates a truncation scheme of moving upwards from a long code word to a shorter code word. To maintain the correct sign of the reconstructed value, each truncation steps takes two steps up the table 800, as indicated by the dashed and solid arrows for negative and positive values respectively. By moving upward in the table 800 in steps of two, a new truncated codebook index $I_{b,m}^{trunc}$ can be found. The upward search continues until $L_{code}(I_{b,m}^{trunc}) \leq B_m-B_{curr,m}$ is satisfied or the top of the table 800 has been reached.

If the length of the codeword determined by the upward search fits does not exceed bit budget, the final index is selected $I_{b,m}^*=I_{b,m}^{trunc}$ and $I_{b,m}^*$ is output to the bitstream and the reconstructed residual is formed based on the final index, i.e. $\hat{r}_{b,m}=R(I_{b,m}^*)$.

If after the upward search, the length of the codeword still exceeds the bit budget, $L_{code}(I_{b,m}^{trunc})>B_m-B_{curr,m}$, this means that the bit limit has been reached $B_m=B_{curr,m}$. In such instances, the reconstructed residual is set to zero $\hat{r}_{b,m}=0$ and an index is not added to the bitstream. Since the decoder keeps a synchronized bit counter, $B_{curr,m}$, the decoder may detect this situation and use $\hat{r}_{b,m}=0$ without explicit signaling.

In an alternative embodiment, if the length of the codeword associated with the initial index exceeds the bit budget, the residual value is immediately set to zero, thereby foregoing the upward search describe above. This could be beneficial if computational complexity is critical.

In step 780, a reconstructed coherence value $\hat{C}_{b,m}$ is formed based on the reconstructed prediction residual and the weighted prediction, i.e. $\hat{C}_{b,m}=\hat{C}_{pred,b,m}^{(q)}+\hat{r}_{b,m}$.

In step 790, the bit counter is incremented accordingly. As described above, the bit counter is increased throughout the encoding process 701.

In some embodiments, the frame-to-frame variations in the coherence vector are small. Hence, the inter-frame prediction using the previous frame value is often a good approximation which yields a small prediction residual and a small residual coding bit rate. Additionally, the prediction weighting factor α serves the purpose of balancing the bit rate versus the frame loss resilience.

Figure 9:
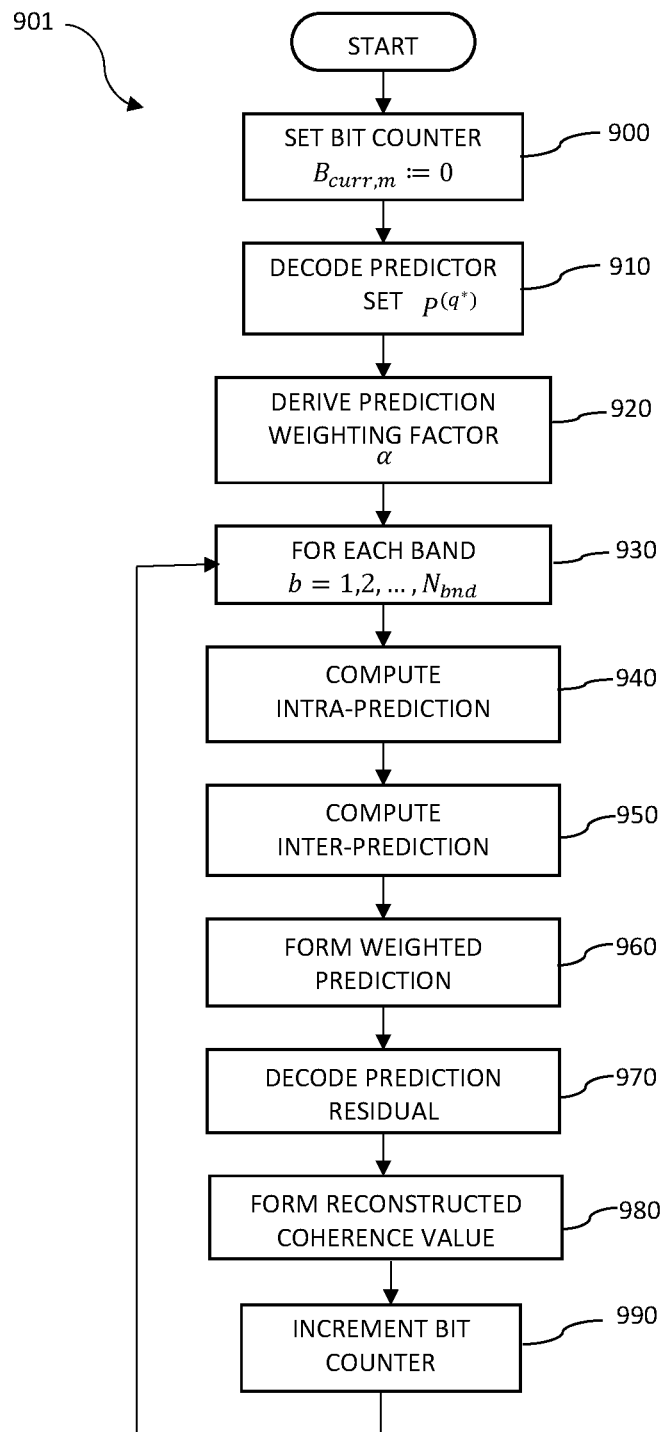
FIG. 9 is a flow chart illustrating a decoding process according to some embodiments.

FIG. 9 is a flow chart illustrating a decoding process 901 according to some embodiments. The decoding process 901 corresponds to the encoding process 701 may be performed by the decoder according to the following steps:

In step 900, a bit counter, $B_{curr,m}$, configured to keep track of the bits spent during the decoding process 901 is initialized to zero, i.e. $B_{curr,m}=0$. For each frame m, the decoder obtains a copy of the last reconstructed coherence vector $\hat{C}_{b,m-1}$ and a bit budget $B_m$.

In step 910, a selected predictor set $P^{(q^*)}$ is decoded from a bitstream. The bit counter is increased by the amount of bits required to decode the selected predictor set. For example, if two bits are required to decode the selected predictor set, the bit counter, $B_{curr,m}$, is increased by two, i.e. $B_{curr,m}:=B_{curr,m}+2$.

In step 920, the prediction weighting factor α corresponding to the weighting factor used in the encoder is derived.

For each of the bands b=1, 2, . . . $N_{bnd}$ in step 930, the following steps are performed:

In step 940, an intra-prediction value, $\hat{C}_{intra,b,m}^{(q)}$, is obtained. The intra-frame prediction for the first band is obtained similarly to step 740 of the encoding process 701. Accordingly, the intra-frame prediction for the first frame may be set to zero ($\hat{C}_{intra,1,m}^{(q)}=0$),
   an average value $\overline{C}$ ($\hat{C}_{intra,1,m}^{(q)}=\overline{C}$) or a coherence value of the first band may be decoded from the bitstream and the intra-frame prediction for the first frame may be set to reconstructed value $\hat{C}_{SQ,1,m}$ ($\hat{C}_{intra,1,m}^{(q)}=\hat{C}_{SQ,1,m}$). If the coefficient is decoded, the bit counter, $B_{curr,m}$, is increased by the amount of bits required for the encoding. For example, if three bits are required for encoding the coefficient, the bit counter, $B_{curr,m}$, is increased by three, i.e. $B_{curr,m}:=B_{curr,m}+3$.

For the remaining bands b=2, 3, . . . , $N_{bnd}$, the intra-frame prediction $\hat{C}_{intrab,m}^{(q)}$ is based on the previously decoded coherence values, i.e. $\hat{C}_{intra,b,m}^{(q)}=\Sigma_{i=1}^{b-1}p_{b,i}^{(q)}\hat{C}_{i,m}$.

In step 950, an inter-frame prediction value, $\hat{C}_{inter,b,m}$, is obtained similarly to step 750 of the encoding process 701. As an example, a last reconstructed value for band b may be used for an inter-frame prediction value, i.e. $\hat{C}_{inter,b,m}=\hat{C}_{b,m-1}$.

In step 960, a weighted prediction, $\hat{C}_{pred,b,m}^{(q)}$, is formed based on the intra-frame prediction, $\hat{C}_{intra,b,m}^{(q)}$, the inter-frame prediction, $\hat{C}_{inter,b,m}$, and the prediction weighting factor α. In some embodiments, the weighted prediction is given by $\hat{C}_{pred,b,m}^{(q)}=\alpha\hat{C}_{intra,b,m}^{(q)}+(1-\alpha)\hat{C}_{inter,b,m}$.

In step 970, a reconstructed prediction residual, $\hat{r}_{b,m}$, is decoded. If the bit counter, $B_{curr,m}$, is below the bit limit, i.e. $B_{curr,m}<B_m$, the reconstructed prediction residual is derived from an available quantizer index $\hat{r}_{b,m}=R(I_{b,m}^*)$. If the bit counter equals or exceeds the bit limit, the reconstructed prediction residual is set to zero, i.e. $\hat{r}_{b,m}=0$.

In step 980, a coherence value $\hat{C}_{b,m}$ is reconstructed based on the reconstructed prediction residual and the weighted prediction, i.e. $\hat{C}_{b,m}=\hat{C}_{pred,b,m}^{(q)}+\hat{r}_{b,m}$. In step 990, the bit counter is incremented.

In some embodiments, further enhancements of the CNG may be required in the encoder. In such embodiments, a local decoder will be run in the encoder where the reconstructed coherence values $\hat{C}_{b,m}$ are used.

Figure 10:
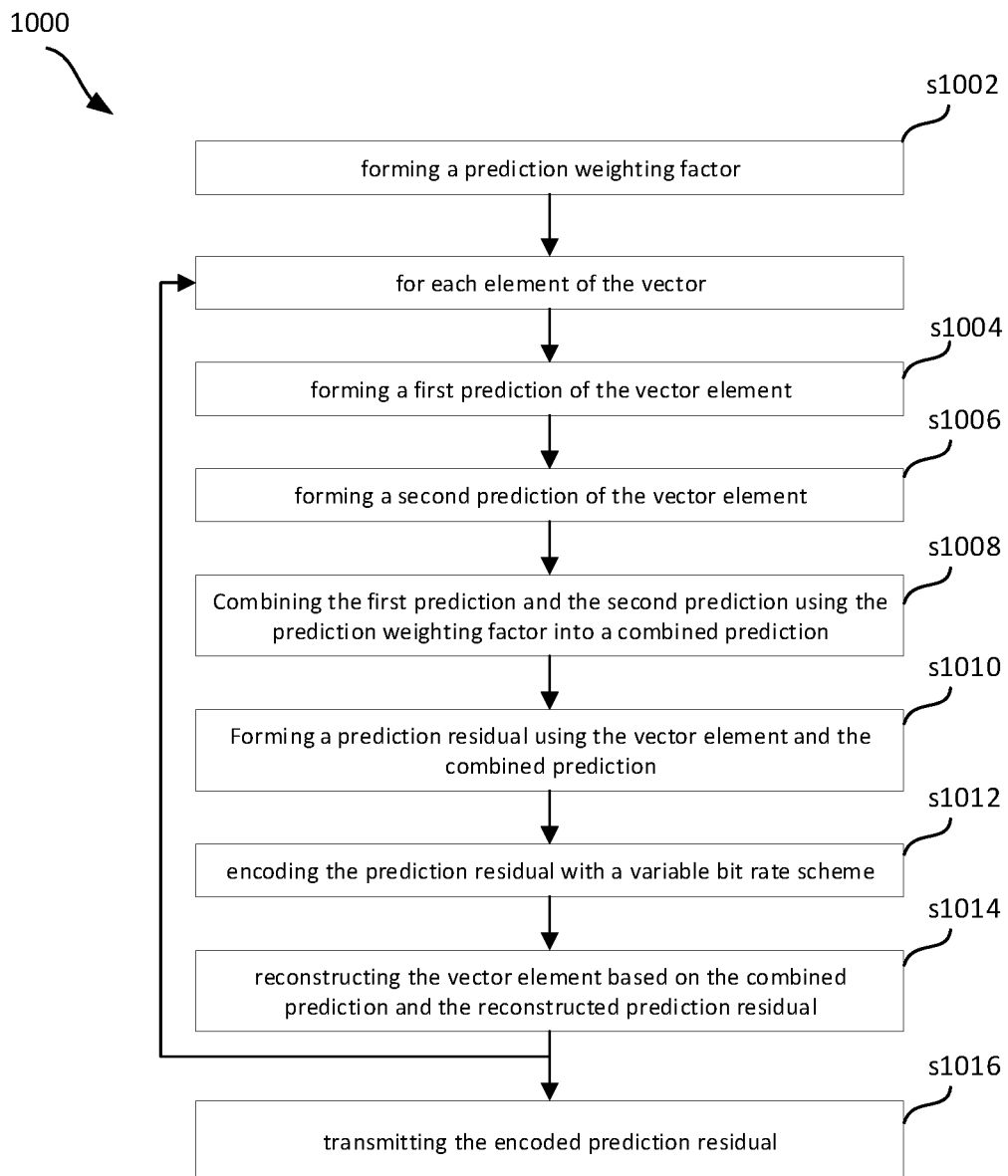
FIG. 10 is a flow chart illustrating a process according to one embodiment.

FIG. 10 is a flow chart illustrating a process 1000, according to some embodiments, that is performed by an encoder of the transmitting node 200a to encode a vector. Process 1000 may begin with step S1002 in which the encoder forms a prediction weighting factor. The following steps S1004 through S1014 may be repeated for each vector element. In step S1004 the encoder forms a first prediction of the vector element. In some embodiments, the first prediction is an intra-frame prediction based on a current vector in the sequence of vectors. In such embodiments, the intra-frame prediction is formed by performing a process which includes selecting a predictor from a set of predictors, applying the selected predictor to the reconstructed elements of the current vector; and encoding an index corresponding to the selected predictor. In step S1006, the encoder forms a second prediction of the vector element. In some embodiments, the second prediction is an inter-frame prediction based on one or more previous vectors in the sequence of reconstructed vectors.

In step S1008, the encoder combines the first prediction and the second prediction using the prediction weighting factor into a combined prediction.

In step S1010, the encoder forms a prediction residual using the vector element and the combined prediction. In step S1012, the encoder encodes the prediction residual with a variable bit rate scheme. In some embodiments, the prediction residual is quantized to form a first residual quantizer index, wherein the first residual quantizer index is associated with a first code word. In some embodiments, the step of encoding the prediction residual with the variable bit rate scheme includes encoding the first residual quantizer index as a result of determining that the length of the first code word does not exceed the amount of remaining bits. In some embodiments, the step of encoding the prediction residual with the variable bit rate scheme includes obtaining a second residual quantizer index as a result of determining that the length of the first code word exceeds the amount of remaining bits, wherein the second residual quantizer index is associated with a second code word, and wherein the length of the second code word is shorter than the length of the first code word. In such embodiments, the process 600 includes a further step in which the encoder determines whether the length of the second code word exceeds the determined amount of remaining bits.

In step S1014, the encoder reconstructs the vector element based on the combined prediction and the prediction residual. In step S1016, the encoder transmits the encoded prediction residual. In some embodiments, the encoder encodes also the prediction weighting factor and transmits the encoded prediction weighting factor.

In some embodiments, the process 1000 includes a further step in which the encoder receives a first signal on a first input channel, receives a second signal on a second input channel, determines spectral characteristics of the first signal and the second signal, determines a spatial coherence based on the determined spectral characteristics of the first signal and the second signal, and determines the vector based on the spatial coherence.

Figure 11:
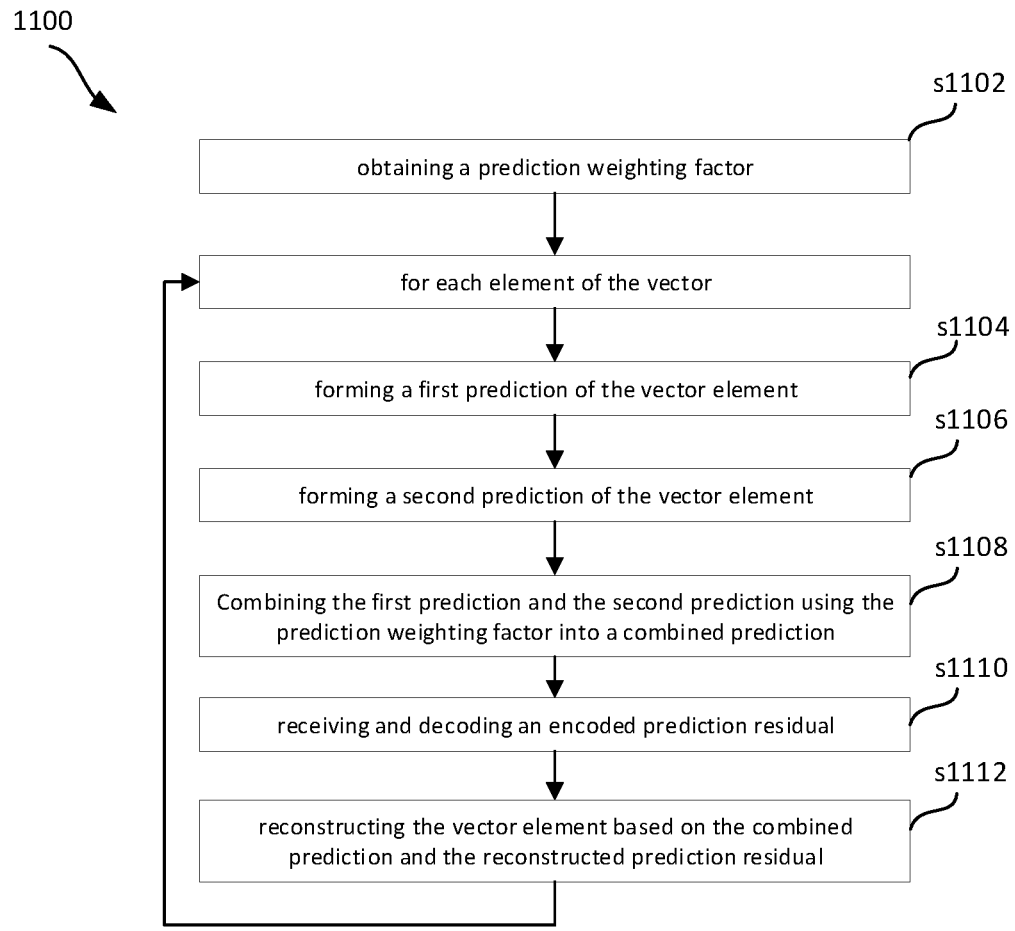
FIG. 11 is a flow chart illustrating a process according to one embodiment.

FIG. 11 is a flow chart illustrating a process 1100, according to some embodiments, that is performed by a decoder of the receiving node 200b to decode a vector. Process 1100 may begin with step S1102 in which the decoder obtains a prediction weighting factor. In some embodiments, the step of obtaining the prediction weighting factor comprises (i) deriving the prediction weighting factor or (ii) receiving and decoding the prediction weighting factor. The following steps S1104 through S1112 may be repeated for each element of the vector. In step S1104 the decoder forms a first prediction of the vector element. In some embodiments, the first prediction is an intra-frame prediction based on a current vector in the sequence of vectors. In such embodiments, the intra-frame prediction is formed by performing a process which includes receiving and decoding a predictor and applying the decoded predictor to reconstructed elements of the current vector. In step S1106, the decoder forms a second prediction of the vector element. In some embodiments, the second prediction is an inter-frame prediction based on one or more previous vectors in the sequence of vectors.

In step S1108, the decoder combines the first prediction and the second prediction using the prediction weighting factor into a combined prediction.

In step S110, the decoder decodes a received encoded prediction residual. In some embodiments, the step of decoding the encoded prediction residual includes determining an amount of remaining bits available for decoding and determining whether decoding the encoded prediction residual exceeds the amount of remaining bits. In some embodiments, the step of decoding the encoded prediction residual includes setting the prediction residual as zero as a result of determining that decoding the encoded prediction residual exceeds the amount of remaining bits. In some embodiments, the step of decoding the encoded prediction residual includes deriving the prediction residual based on a prediction index as a result of determining that decoding the encoded prediction residual does not exceed the amount of remaining bits, wherein the prediction index is a quantization of the prediction residual.

In step S1112, the decoder reconstructs the vector element based on the combined prediction and the prediction residual. In some embodiments, the vector is one of a sequence of vectors. In some embodiments, the process 1100 further includes a step in which the decoder generates signals for at least two output channels based on the reconstructed vector.

Figure 12:
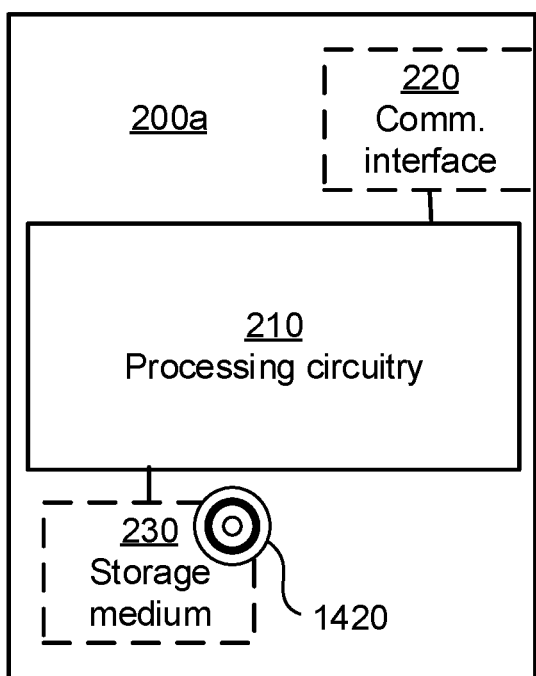
FIG. 12 is a schematic diagram showing functional units of a transmitting node according to an embodiment.

FIG. 12 schematically illustrates, in terms of a number of functional units, the components of a transmitting node 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1410 (as in FIG. 14), e.g. in the form of a storage medium 230. The processing circuitry 210 may further be provided as at least one application specific integrated circuit (ASIC), or field programmable gate array (FPGA).

Particularly, the processing circuitry 210 is configured to cause the transmitting node 200a to perform a set of operations, or steps, as disclosed above. For example, the storage medium 230 may store the set of operations, and the processing circuitry 210 may be configured to retrieve the set of operations from the storage medium 230 to cause the transmitting node 200a to perform the set of operations. The set of operations may be provided as a set of executable instructions. Thus the processing circuitry 210 is thereby arranged to execute methods as herein disclosed.

In an embodiment the transmitting node 200a for supporting generation of comfort noise for at least two audio channels at a receiving node comprises a processing circuitry 210. The processing circuitry is configured to cause the transmitting node to determine spectral characteristics of audio signals on at least two input audio channels, and to determine a spatial coherence between the audio signals on the respective input audio channels, wherein the spatial coherence is associated with perceptual importance measures. The transmitting node is further caused to divide the spatial coherence into frequency bands, wherein a compressed representation of the spatial coherence is determined per frequency band by weighting the spatial coherence within each frequency band according to the perceptual importance measures. The transmitting node is further caused to signal information about the spectral characteristics and information about the compressed representation of the spatial coherence per frequency band to the receiving node, for enabling the generation of the comfort noise for the at least two audio channels at the receiving node.

The transmitting node 200a may further be caused to encode the spatial coherence vector by forming a first prediction of the vector, a second prediction of the vector, a prediction weighting factor, and a prediction residual using the vector and the combined prediction. The transmitting node may further be caused to encode the prediction residual with a variable bit rate scheme and to reconstruct the vector based on the combined prediction and the prediction residual. The transmitting node may further be caused to transmit the encoded prediction weighting factor and the encoded prediction residual to the receiving node 200b.

The storage medium 230 may also comprise persistent storage, which, for example, can be any single one or combination of magnetic memory, optical memory, solid state memory or even remotely mounted memory. The transmitting node 200a may further comprise a communications interface 220 at least configured for communications with a receiving node 200b. As such the communications interface 220 may comprise one or more transmitters and receivers, comprising analogue and digital components. The processing circuitry 210 controls the general operation of the transmitting node 200a e.g. by sending data and control signals to the communications interface 220 and the storage medium 230, by receiving data and reports from the communications interface 220, and by retrieving data and instructions from the storage medium 230. Other components, as well as the related functionality, of the transmitting node 200a are omitted in order not to obscure the concepts presented herein.

Figure 13:
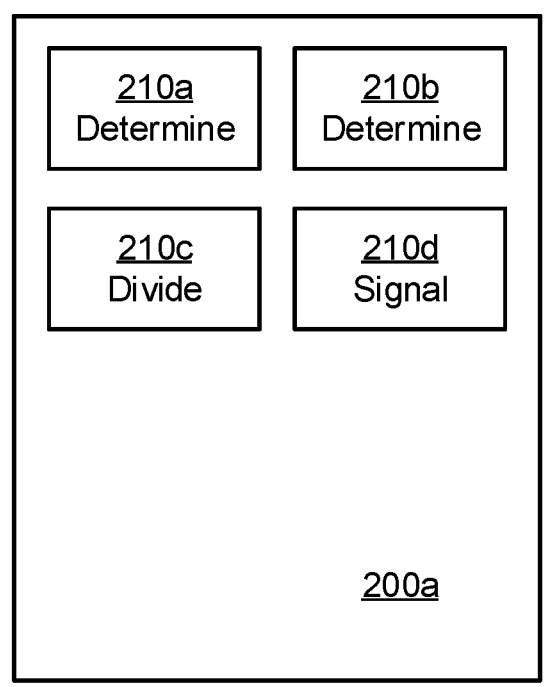
FIG. 13 is a schematic diagram showing functional modules of a transmitting node according to an embodiment.

FIG. 13 schematically illustrates, in terms of a number of functional modules, the components of a transmitting node 200a according to an embodiment. The transmitting node 200a of FIG. 13 comprises a number of functional modules; a determine module 210a configured to perform steps S102, S202, a determine module 210b configured to perform steps S104, S204, a divide module 210c configured to perform step S106, and a signal module 210d configured to perform steps S108, S206. The transmitting node 200a of FIG. 13 may further comprise a number of optional functional modules (not shown in FIG. 8). The transmitting node may for example comprise a first forming unit for forming a first prediction of the vector, a second forming unit for forming a second prediction of the vector, a third forming unit and an encoding unit for forming and encoding a prediction weighting factor, a combining unit for combining the first prediction and the second prediction using the prediction weighting factor into a combined prediction, a fourth forming unit for forming a prediction residual using the vector and the combined prediction, an encoding unit 1014 for encoding the prediction residual with a variable bit rate scheme. A signal module 210d may further be configured for transmitting the encoded prediction weighting factor and the encoded prediction residual.

In general terms, each functional module 210a-210d may in one embodiment be implemented only in hardware and in another embodiment with the help of software, i.e., the latter embodiment having computer program instructions stored on the storage medium 230 which when run on the processing circuitry makes the transmitting node 200a perform the corresponding steps mentioned above in conjunction with FIG. 12. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

The transmitting node 200a may be provided as a stand-alone device or as a part of at least one further device. For example, as in the example of FIG. 1, in some aspects the transmitting node 200a is part of a radio transceiver device 200. Hence, in some aspects there is provided a radio transceiver device 200 comprising a transmitting node 200a as herein disclosed. In some aspects the radio transceiver device 200 further comprises the receiving node 200b.

Alternatively, functionality of the transmitting node 200a may be distributed between at least two devices, or nodes. These at least two nodes, or devices, may either be part of the same network part or may be spread between at least two such network parts. Thus, a first portion of the instructions performed by the transmitting node 200a may be executed in a first device, and a second portion of the of the instructions performed by the transmitting node 200a may be executed in a second device; the herein disclosed embodiments are not limited to any particular number of devices on which the instructions performed by the transmitting node 200a may be executed. Hence, the methods according to the herein disclosed embodiments are suitable to be performed by a transmitting node 200a residing in a cloud computational environment. Therefore, although a single processing circuitry 210 is illustrated in FIG. 12 the processing circuitry 210 may be distributed among a plurality of devices, or nodes. The same applies to the functional modules 210a-210d of FIG. 13 and the computer program 1420 of FIG. 14 (see below).

The receiving node 200b comprises a decoder for reconstructing the coherence and for creating a comfort noise signal with a stereo image similar to the original sound. The decoder may further be configured to form a first prediction of the vector and a second prediction of the vector, and to obtain a prediction weighting factor. The decoder may further be configured to combine the first prediction and the second prediction using the prediction weighting factor into a combined prediction. The decoder may further be configured to reconstruct the vector based on the combined prediction and the received and decoded prediction residual.

FIG. 14 shows one example of a computer program product 1410 comprising computer readable storage medium 1430. On this computer readable storage medium 1430, a computer program 1420 can be stored, which computer program 1420 can cause the processing circuitry 210 and thereto operatively coupled entities and devices, such as the communications interface 220 and the storage medium 230, to execute methods according to embodiments described herein. The computer program 1420 and/or computer program product 1410 may thus provide means for performing any steps as herein disclosed.

In the example of FIG. 14, the computer program product 1410 is illustrated as an optical disc, such as a CD (compact disc) or a DVD (digital versatile disc) or a Blu-Ray disc. The computer program product 1410 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420 is here schematically shown as a track on the depicted optical disk, the computer program 1420 can be stored in any way which is suitable for the computer program product 1410.

The proposed solution disclosed herein applies to a stereo encoder and decoder architecture or a multi-channel encoder and decoder where the channel coherence is considered in channel pairs.

Figure 15:
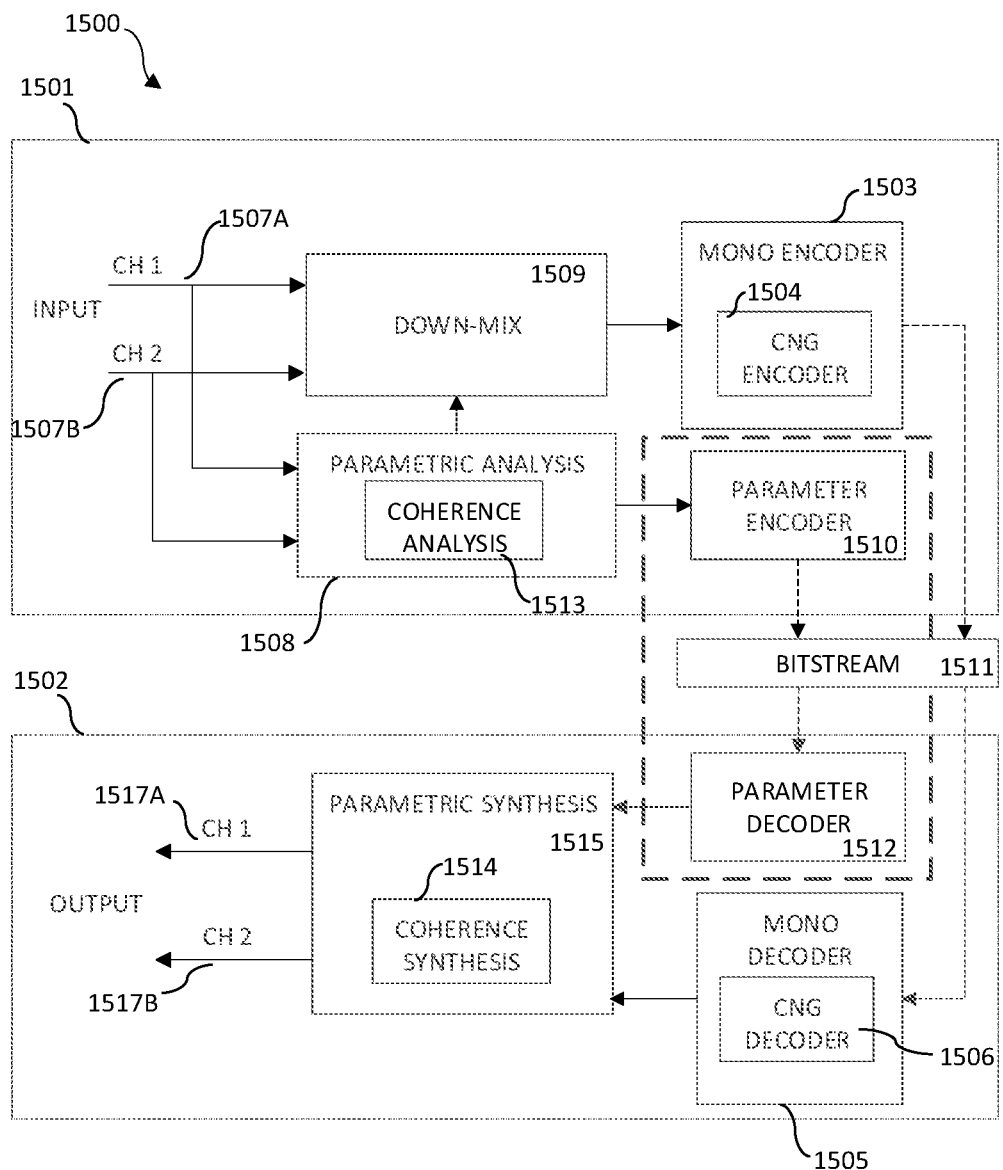
FIG. 15 illustrates a stereo encoding and decoding system according to some embodiments.

FIG. 15 illustrates a parametric stereo encoding and decoding system 1500 according to some embodiments. The parametric stereo encoding and decoding system 1500 comprises a mono encoder 1503 including a CNG encoder 1504 and a mono decoder 1505 including a CNG decoder 1506. The encoder 1501 performs an analysis of the input channel pair 1507A-1507B and obtains a parametric representation of a stereo image through parametric analysis 1508 and reduces the channels to a single channel through down-mix 1509 thereby obtaining a down-mixed signal. The down-mixed signal is encoded with a mono encoding algorithm by a mono encoder 1503 and the parametric representation of the stereo image is encoded by a parameter encoder 1510. The encoded down-mixed signal and parametric representation of the stereo image is transmitted through a bitstream 1511. The decoder 1502 employs a mono decoder 1505 to apply a mono decoding algorithm and obtains a synthesized down-mixed signal. A parameter decoder 1512 decodes the received parametric representation of the stereo image. The decoder 1502 transforms the synthesized down-mix signal into a synthesized channel pair using the decoded parametric representation of the stereo image. The parametric stereo encoding and decoding system 1500 further comprises a coherence analysis 1513 in the parametric analysis 1508 and a coherence synthesis 1514 in the parametric synthesis 1515. The parametric analysis 1508 includes the capability to analyze the coherence of the input signals 1507A-1507B. The parametric analysis 1508 may analyze the input signals 1507A-1507B when the mono encoder 1503 is configured to operate as the CNG encoder 1504. The mono encoder 1503 may further comprise a stereo encoder VAD according to some embodiments. The stereo encoder VAD may indicate to the CNG encoder 1504 that a signal contains background noise, thereby activating the CNG encoder 1504. Accordingly, a CNG analysis comprising the coherence analysis 1513 is activated in the parametric analysis 1508 and the mono encoder 1503 initiates the CNG encoder 1504. As a result, an encoded representation of the coherence and the mono CNG is bundled together in the bitstream 1511 for transmission and/or storing. The decoder 1502 identifies the stereo CNG frame in the bitstream 1511, decodes the mono CNG and the coherence values, and synthesizes the target coherence. When decoding a CNG frame, the decoder 1502 produces two CNG frames corresponding to the two synthesis channels 1517A-1517B.

Here now follows a set of example embodiments to further describe the concepts presented herein.

1. A method for supporting generation of comfort noise for at least two audio channels at a receiving node, the method being performed by a transmitting node, the method comprising:
   determining spectral characteristics of audio signals on at least two input audio channels;
   determining a spatial coherence between the audio signals on the respective input audio channels, wherein the spatial coherence is associated with perceptual importance measures;
   dividing the spatial coherence into frequency bands, wherein a compressed representation of the spatial coherence is determined per frequency band by weighting the spatial coherence values within each frequency band according to the perceptual importance measures; and
   signaling information about the spectral characteristics and information about the compressed representation of the spatial coherence per frequency band to the receiving node, for enabling the generation of the comfort noise for the at least two audio channels at the receiving node.
2. The method according to item 1, wherein the perceptual importance measure is based on the spectral characteristics of the at least two input audio channels.
3. The method according to item 2, wherein the perceptual importance measure is determined based on the power spectra of the at least two input audio channels.
4. The method according to item 2, wherein the perceptual importance measure is determined based on the power spectrum of a weighed sum of the at least two input audio channels.
5. The method according to item 1, wherein the compressed representation of the spatial coherence is being one single value per frequency band.
6. A method for supporting generation of comfort noise for at least two audio channels at a receiving node, the method being performed by a transmitting node, the method comprising:
   determining spectral characteristics of audio signals on at least two input audio channels, wherein the spectral characteristics are associated with perceptual importance measures;
   determining a spatial coherence between the audio signals on the respective input audio channels, wherein the spatial coherence is divided into frequency bands, and wherein one single value of the spatial coherence is determined per frequency band by weighting the spatial coherence values within each frequency band according to the perceptual importance measures of the corresponding values of the spectral characteristics; and
   signaling information about the spectral characteristics and information about the single values of the spatial coherence per frequency band to the receiving node, for enabling the generation of the comfort noise for the at least two audio channels at the receiving node.
7. The method according to item 1 or 6, wherein the perceptual importance measure of a given value of the spectral characteristics is defined by the power of the sum of the audio signals on at least two input audio channels.
8. The method according to item 1 or 6, wherein the spatial coherence values within each frequency band are weighted such that the spatial coherence values corresponding to values of the spectral characteristics with a higher energy has more impact on said one single value of the spatial coherence compared to the spatial coherence values corresponding to values of the spectral characteristics with lower energy.
9. The method according to item 1 or 6, wherein the audio signals l(m, n), r(m, n), for frame index m and sample index n, of the at least two audio channels are windowed to form respective windowed signals $l_{win}$(m, n), $r_{win}$(m, n) before the spectral characteristics are determined.
10. The method according to item 9, wherein the spatial coherence C(m, k) for frame index m and sample index k is determined as:

$$C(m, k) = \frac{|L(m, k)^* \cdot R(m, k)|^2}{|L(m, k)|^2 \cdot |R(m, k)|^2}$$

where L(m, k) is the spectrum of the windowed audio signal $l_{win}$(m, n), where R(m, k) is the spectrum of the windowed audio signal $r_{win}$(m, n), and where * denotes complex conjugate.
11. The method according to item 10, wherein an energy spectrum $|LR(m, k)|^2$ of lr(m, n)=l(m, n)+r(m, n) defines the perceptual importance measures within frame m and is used for weighting the spatial coherence values.
12. The method according to item 11, wherein each frequency band extends between a lower border and an upper border, and wherein said one single value of the spatial coherence for frame index m and frequency band b is denoted $C_w$(m, b) and is determined as:

$$C_w(m, b) = \frac{\sum_{i=limit(b)}^{limit(b+1)-1} C(m, i) \cdot |LR(m, i)|^2}{\sum_{j=limit(b)}^{limit(b+1)-1} |LR(m, j)|^2}$$

$$b = 0, 1, \ldots, N_{band} - 1$$

where $N_{band}$ denotes total number of frequency bands, and where limit(b) denotes the lower frequency bin of frequency band b.
13. The method according to item 12, wherein limit(b) is provided as a function or lookup table.
14. The method according to item 1 or 6, wherein the spatial coherence is divided into frequency bands of non-equal lengths.
15. A transmitting node for supporting generation of comfort noise for at least two audio channels at a receiving node, the transmitting node comprising processing circuitry, the processing circuitry being configured to cause the transmitting node to:
   determine spectral characteristics of audio signals on at least two input audio channels;
   determine a spatial coherence between the audio signals on the respective input audio channels, wherein the spatial coherence is associated with perceptual importance measures;
   divide the spatial coherence into frequency bands, wherein a compressed representation of the spatial coherence is determined per frequency band by weighting the spatial coherence values within each frequency band according to the perceptual importance measures; and signal information about the spectral characteristics and information about the compressed representation of the spatial coherence per frequency band to the receiving node, for enabling the generation of the comfort noise for the at least two audio channels at the receiving node.

16. The transmitting node according to item 15, further being configured to perform the method according to any of items 2 to 5.

17. A transmitting node for supporting generation of comfort noise for at least two audio channels at a receiving node, the transmitting node comprising processing circuitry, the processing circuitry being configured to cause the transmitting node to:
determine spectral characteristics of audio signals on at least two input audio channels, wherein the spectral characteristics are associated with perceptual importance measures;
determine a spatial coherence between the audio signals on the respective input audio channels, wherein the spatial coherence is divided into frequency bands, and wherein one single value of the spatial coherence is determined per frequency band by weighting the spatial coherence values within each frequency band according to the perceptual importance measures of the corresponding values of the spectral characteristics; and
signal information about the spectral characteristics and information about the single values of the spatial coherence per frequency band to the receiving node, for enabling the generation of the comfort noise for the at least two audio channels at the receiving node.

18. The transmitting node according to item 17, further being configured to perform the method according to any of items 7 to 14.

19. A radio transceiver device, the radio transceiver device comprising a transmitting node according to any of items 15 to 18.

20. The radio transceiver device according to item 19, further comprising the receiving node.

21. A computer program for supporting generation of comfort noise for at least two audio channels at a receiving node, the computer program comprising computer code which, when run on processing circuitry of the transmitting node, causes the transmitting node to:
determine spectral characteristics of audio signals on at least two input audio channels;
determine a spatial coherence between the audio signals on the respective input audio channels, wherein the spatial coherence is associated with perceptual importance measures;
divide the spatial coherence into frequency bands, wherein a compressed representation of the spatial coherence is determined per frequency band by weighting the spatial coherence values within each frequency band according to the perceptual importance measures; and
signal information about the spectral characteristics and information about the compressed representation of the spatial coherence per frequency band to the receiving node, for enabling the generation of the comfort noise for the at least two audio channels at the receiving node.

22. A computer program for supporting generation of comfort noise for at least two audio channels at a receiving node, the computer program comprising computer code which, when run on processing circuitry of the transmitting node, causes the transmitting node to:
determine spectral characteristics of audio signals on at least two input audio channels, wherein the spectral characteristics are associated with perceptual importance measures;
determine a spatial coherence between the audio signals on the respective input audio channels, wherein the spatial coherence is divided into frequency bands, and wherein one single value of the spatial coherence is determined per frequency band by weighting the spatial coherence values within each frequency band according to the perceptual importance measures of the corresponding values of the spectral characteristics; and
signal information about the spectral characteristics and information about the single values of the spatial coherence per frequency band to the receiving node, for enabling the generation of the comfort noise for the at least two audio channels at the receiving node.

23. A computer program product comprising a computer program according to at least one of items 21 and 22, and a computer readable storage medium on which the computer program is stored.

Generally, all terms used in the example embodiments and appended claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

The inventive concept has mainly been described above with reference to a few embodiments. However, as is readily appreciated by a person skilled in the art, other embodiments than the ones disclosed above are equally possible within the scope of the inventive concept, as defined by the appended list of enumerated embodiments.

The invention claimed is:

1. A method for supporting generation of comfort noise for at least two audio channels at a receiving node, the method being performed by a transmitting node, the method comprising:
determining spectral characteristics of audio signals on at least two input audio channels;
determining a spatial coherence between the audio signals on the respective input audio channels, wherein the spatial coherence is associated with a value of a spectral characteristic corresponding to a perceptual importance of a frequency band;
dividing the spatial coherence into frequency bands, wherein a compressed representation of the spatial coherence is determined per frequency band by determining a weighted mean of the spatial coherence within each frequency band according to the value of a spectral characteristic corresponding to a perceptual importance of the frequency band; and
signaling information about the spectral characteristics and information about the compressed representation of the spatial coherence per frequency band to the receiving node, for enabling the generation of the comfort noise for the at least two audio channels at the receiving node.

2. The method according to claim 1, wherein the compressed representation of the spatial coherence is being one single value per frequency band.

3. The method according to claim 2, wherein the spatial coherence values within each frequency band are weighted such that the spatial coherence values corresponding to values of frequency coefficients with a higher energy has more impact on said one single value of the spatial coherence compared to the spatial coherence values corresponding to values of frequency coefficients with lower energy.

4. The method according to claim 1, wherein the value of a spectral characteristic corresponding to a perceptual importance of the frequency band is based on the spectral characteristics of the at least two input audio channels.

5. The method according to claim 1, wherein the value of a spectral characteristic corresponding to a perceptual importance of the frequency band is determined based on the power spectra of the at least two input audio channels.

6. The method according to claim 1, wherein the value of a spectral characteristic corresponding to a perceptual importance of the frequency band is determined based on the power spectrum of a weighed sum of the at least two input audio channels.

7. The method according to claim 1, wherein the value of a spectral characteristic corresponding to a perceptual importance of the frequency band of a given value of the spectral characteristics is based on the power spectrum of the sum of the audio signals on at least two input audio channels.

8. The method according to claim 1, wherein an energy spectrum $|LR(m,k)|^2$ of $lr(m, n)=l(m, n)+r(m, n)$, where $l(m, n)$ denote the input signal for the left channel and $r(m, n)$ denote the input signal for the right channel, defines the value of a spectral characteristic corresponding to a perceptual importance of a frequency band within frame m and is used for weighting the spatial coherence values.

9. The method according to claim 8, wherein one single value of the spatial coherence $C_w(m, b)$ for frame index m and frequency band b is determined as:

$$C_w(m, b) = \frac{\sum_{k=limit(b)}^{limit(b+1)-1} C(m, i) \cdot |LR(m, i)|^2}{\sum_{j=limit(b)}^{limit(b+1)-1} |LR(m, j)|^2}$$

$$b = 0, 1, \ldots, N_{band} - 1$$

where $N_{band}$ denotes total number of frequency bands, and where limit(b) denotes the lowest frequency bin of frequency band b.

10. A transmitting node for supporting generation of comfort noise for at least two audio channels at a receiving node, the transmitting node comprising processing circuitry, the processing circuitry being configured to cause the transmitting node to:
 determine spectral characteristics of audio signals on at least two input audio channels;
 determine a spatial coherence between the audio signals on the respective input audio channels, wherein the spatial coherence is associated with a value of a spectral characteristic corresponding to a perceptual importance of a frequency band;
 divide the spatial coherence into frequency bands, wherein a compressed representation of the spatial coherence is determined per frequency band by determining a weighted mean of the spatial coherence within each frequency band according to the value of a spectral characteristic corresponding to a perceptual importance of the frequency band; and
 signal information about the spectral characteristics and information about the compressed representation of the spatial coherence per frequency band to the receiving node, for enabling the generation of the comfort noise for the at least two audio channels at the receiving node.

11. The transmitting node according to claim 10, wherein the compressed representation of the spatial coherence is being one single value per frequency band.

12. The transmitting node according to claim 10, wherein the value of a spectral characteristic corresponding to a perceptual importance of the frequency band is based on the spectral characteristics of the at least two input audio channels.

13. The transmitting node according to claim 10, wherein the value of a spectral characteristic corresponding to a perceptual importance of the frequency band is determined based on the power spectra of the at least two input audio channels.

14. The transmitting node according to claim 10, wherein the value of a spectral characteristic corresponding to a perceptual importance of the frequency band is determined based on the power spectrum of a weighed sum of the at least two input audio channels.

15. The transmitting node according to claim 10, wherein the value of a spectral characteristic corresponding to a perceptual importance of the frequency band of a given value of the spectral characteristics is based on the power spectrum of the sum of the audio signals on at least two input audio channels.

16. The transmitting node according to claim 10, wherein the spatial coherence values within each frequency band are weighted such that the spatial coherence values corresponding to values of frequency coefficients with a higher energy has more impact on said one single value of the spatial coherence compared to the spatial coherence values corresponding to values of frequency coefficients with lower energy.

17. The transmitting node according to claim 10, wherein an energy spectrum $|LR(m, k)|^2$ of $lr(m, n)=l(m, n)+r(m, n)$, where $l(m, n)$ denote the input signal for the left channel and $r(m, n)$ denote the input signal for the right channel, defines the value of a spectral characteristic corresponding to a perceptual importance of the frequency band within frame m and is used for weighting the spatial coherence values.

18. The transmitting node according to claim 17, wherein one single value of the spatial coherence $C_w(m, b)$ for frame index m and frequency band b is determined as:

$$C_w(m, b) = \frac{\sum_{k=limit(b)}^{limit(b+1)-1} C(m, i) \cdot |LR(m, i)|^2}{\sum_{j=limit(b)}^{limit(b+1)-1} |LR(m, j)|^2}$$

$$b = 0, 1, \ldots, N_{band} - 1$$

where $N_{band}$ denotes total number of frequency bands, and where limit(b) denotes the lowest frequency bin of frequency band b.

* * * * *

UNITED STATES PATENT AND TRADEMARK OFFICE
CERTIFICATE OF CORRECTION

| | |
|---|---|
| PATENT NO. | : 11,837,242 B2 |
| APPLICATION NO. | : 17/844803 |
| DATED | : December 5, 2023 |
| INVENTOR(S) | : Jansson et al. |

It is certified that error appears in the above-identified patent and that said Letters Patent is hereby corrected as shown below:

On the Title Page

On Page 2, item [56], in Column 2, Line 40, delete "171044,740," and insert -- 17/044,740, --, therefor.

In the Specification

Column 10, Line 53, delete "$p^{(q)}$" and insert -- $P^{(q)}$ --, therefor.

Column 11, Line 31, delete "$B_{curr,m}$" and insert -- $B_{curr,m} :=$ --, therefor.

Column 12, Line 65, delete "$\min(B_{currrlow,m},$" and insert -- $\min(B_{currlow,m},$ --, therefor.

Column 13, Line 21, delete "$\hat{C}_{SQ,1,m}^{(q)}.$" and insert -- $\hat{C}_{SQ,1,m}.$ --, therefor.

Column 13, Line 23, delete "$\hat{C}_{SQ,1,m}^{(q)}.$" and insert -- $\hat{C}_{SQ,1,m}.$ --, therefor.

Column 17, Line 13, delete "S110," and insert -- S1110, --, therefor.

Signed and Sealed this
Twenty-sixth Day of March, 2024

*Katherine Kelly Vidal*
*Director of the United States Patent and Trademark Office*